US012784387B2

(12) United States Patent
Robert et al.

(10) Patent No.: US 12,784,387 B2
(45) Date of Patent: Nov. 3, 2026

(54) MAINTAINING EYE CONTACT BETWEEN REPRESENTATIONS OF USERS IN THREE-DIMENSIONAL ENVIRONMENTS

(71) Applicant: Apple Inc., Cupertino, CA (US)

(72) Inventors: Julien Robert, San Francisco, CA (US); Long H. Ngo, San Jose, CA (US); Shih-Sang Chiu, San Francisco, CA (US); Wenchuan Wei, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 18/893,319

(22) Filed: Sep. 23, 2024

(65) Prior Publication Data

US 2025/0111633 A1 Apr. 3, 2025

Related U.S. Application Data

(60) Provisional application No. 63/586,635, filed on Sep. 29, 2023.

(51) Int. Cl.
*G06T 19/20* (2011.01)

(52) U.S. Cl.
CPC ...... *G06T 19/20* (2013.01); *G06T 2219/2004* (2013.01); *G06T 2219/2016* (2013.01)

(58) Field of Classification Search
CPC ....... G06T 19/20; G06T 19/00; G06T 19/006; G06T 15/00; G06T 15/005; G06T 15/04; G06T 15/10; G06T 15/205; G06T 15/80; G06T 17/00; G06T 17/10; G06T 2219/2004; G06T 2219/2016
See application file for complete search history.

(56) References Cited

U.S. PATENT DOCUMENTS

| | | | | |
|---|---|---|---|---|
| 8,154,583 | B2 | 4/2012 | Kurtz et al. | |
| 9,639,159 | B2 * | 5/2017 | Pesonen | G06F 3/0393 |
| 11,763,559 | B2 * | 9/2023 | Wang | G02B 27/017 345/633 |
| 12,100,207 | B2 * | 9/2024 | Wang | G06V 20/20 |
| 2022/0383634 | A1 * | 12/2022 | Wang | G02B 27/017 |
| 2024/0094863 | A1 | 3/2024 | Smith et al. | |
| 2024/0203046 | A1 * | 6/2024 | Rakshit | G06T 13/40 |
| 2025/0209744 | A1 * | 6/2025 | Piemonte | H04L 65/1069 |
| 2025/0209753 | A1 * | 6/2025 | Piemonte | G06F 3/011 |

* cited by examiner

*Primary Examiner* — Vijay Shankar
(74) *Attorney, Agent, or Firm* — Kubota & Basol LLP

(57) ABSTRACT

In some examples, a first electronic device presents a computer-generated environment, the first electronic device being at a first location relative to a first origin in a first physical environment of a user of the first electronic device, and having a first orientation relative to the first origin. In some examples, the first electronic device detects a request to display a portal through which to visually communicate with a user of the second electronic device, the second electronic device being at a second location relative to a second origin in a second physical environment of the user of the second electronic device and having a second orientation relative to the second origin. In some examples, in response to the request, the first electronic device displays a portal including a representation of the user of the second electronic device that is oriented based on the second location and the second orientation.

24 Claims, 14 Drawing Sheets

Device 1 Top-Down View

Device 1 Top-Down View

Device 1 Top-Down View

MAINTAINING EYE CONTACT BETWEEN REPRESENTATIONS OF USERS IN THREE-DIMENSIONAL ENVIRONMENTS

CROSS-REFERENCE TO RELATED APPLICATIONS

This application claims the benefit of U.S. Provisional Application No. 63/586,635, filed Sep. 29, 2023, the content of which is herein incorporated by reference in its entirety for all purposes.

FIELD OF THE DISCLOSURE

This relates generally to systems and methods of maintaining eye contact between users in different physical environments who are visually communicating within a computer-generated environment.

BACKGROUND OF THE DISCLOSURE

Some computer graphical environments provide two-dimensional and/or three-dimensional environments where at least some objects displayed for a user's viewing are virtual and generated by a computer. In some examples, three-dimensional environments are presented by multiple electronic devices in communication with each other. In some examples, a portal through which to visually communicate with a particular user is displayed in a three-dimensional environment presented at a respective electronic device.

SUMMARY OF THE DISCLOSURE

Some examples of the disclosure are directed to systems and methods for maintaining eye contact between users who are visually communicating using portals in a computer-generated environment. In some examples, a method is performed at a first electronic device in communication with one or more displays, one or more input devices, and a second electronic device. In some examples, the first electronic device presents, via the one or more displays, a computer-generated environment, wherein the first electronic device is located at a first location relative to a first origin in a first physical environment of a user of the first electronic device, and has a first orientation relative to the first origin in the first physical environment of the user of the first electronic device. In some examples, while presenting the computer-generated environment, the first electronic device detects a request to display a portal through which to visually communicate with a user of the second electronic device, wherein the second electronic device is located at a second location, different from the first location, relative to a second origin in a second physical environment, different from the first physical environment, of the user of the second electronic device and has a second orientation, different from the first orientation, relative to the second origin in the second physical environment of the user of the second electronic device. In some examples, in response to detecting the request, the first electronic device displays, via the one or more displays, a portal including a representation of the user of the second electronic device in the computer-generated environment, wherein a respective portion of the representation of the user of the second electronic device is oriented based on the second location and the second orientation (e.g., and to face toward a viewpoint of the user of the first electronic device).

In some examples, the representation of the user of the second electronic device is positioned and/or oriented within the portal such that the representation of the second electronic device is maintaining eye contact with the user of the first electronic device in the first computer-generated environment. In some examples, the first electronic device, based on data received from the second electronic device, transposes the user of the second electronic device to the first computer-generated environment, such that the second location and the second orientation of the second electronic device relative to the second origin are mapped to the first computer-generated environment and known to the first electronic device. In some examples, the first electronic device positions the transposed location of the user of the second electronic device to be positioned within the portal and applies a rotation to the transposed orientation of the user of the second electronic device such that the displayed representation of the second electronic device in the portal in the first computer-generated environment is oriented to face toward the viewpoint of the user of the first electronic device.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
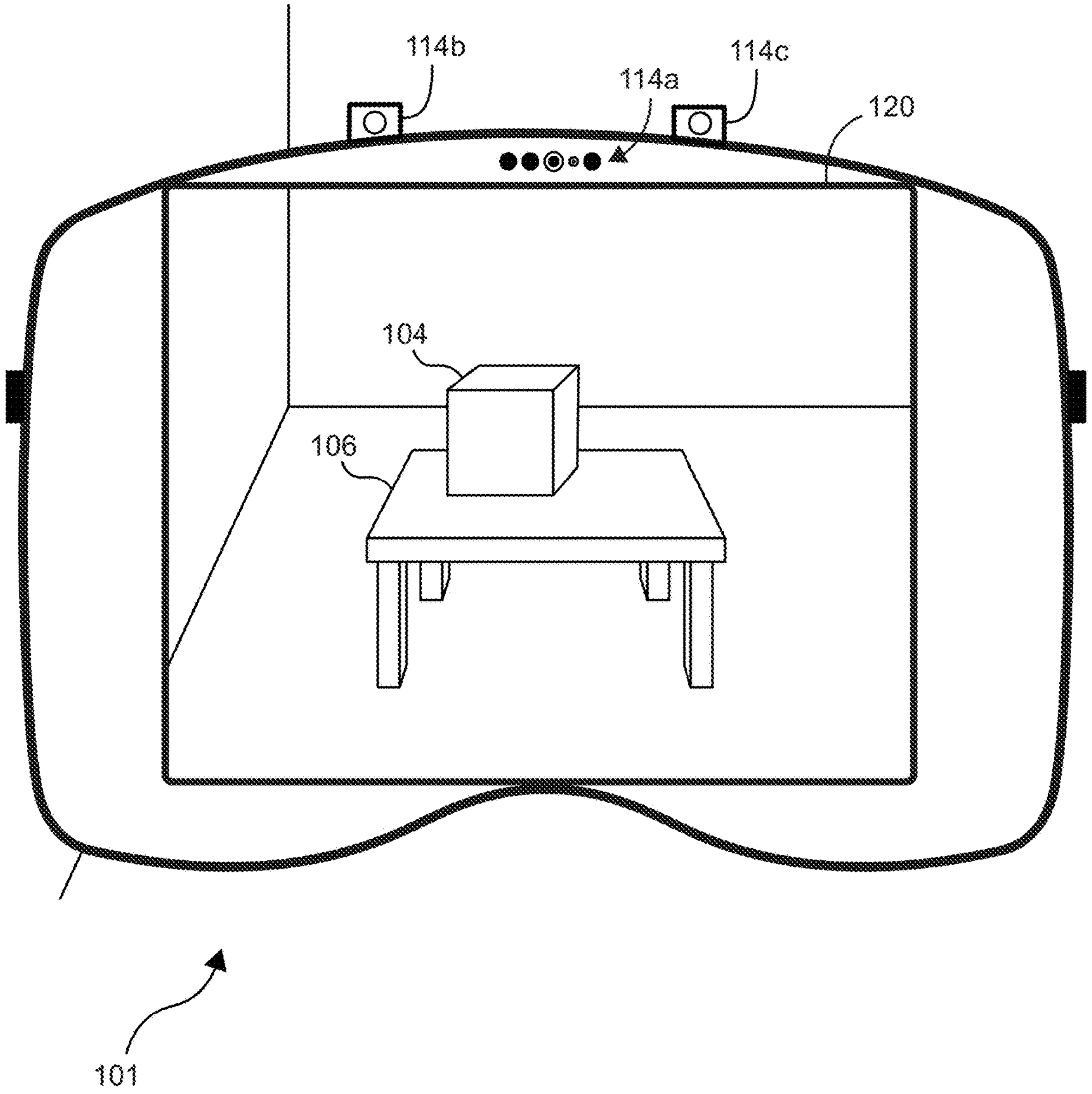
FIG. 1 illustrates an electronic device presenting an extended reality environment according to some examples of the disclosure.

Some examples of the disclosure are directed to systems and methods for maintaining eye contact between users who are visually communicating using portals in a computer-generated environment. In some examples, a method is performed at a first electronic device in communication with one or more displays, one or more input devices, and a second electronic device. In some examples, the first electronic device presents, via the one or more displays, a computer-generated environment, wherein the first electronic device is located at a first location relative to a first origin in a first physical environment of a user of the first electronic device, and has a first orientation relative to the first origin in the first physical environment of the user of the first electronic device. In some examples, while presenting the computer-generated environment, the first electronic device detects a request to display a portal through which to visually communicate with a user of the second electronic device, wherein the second electronic device is located at a second location, different from the first location, relative to a second origin in a second physical environment, different from the first physical environment, of the user of the second electronic device and has a second orientation, different from the first orientation, relative to the second origin in the second physical environment of the user of the second electronic device. In some examples, in response to detecting the request, the first electronic device displays, via the one or more displays, a portal including a representation of the user of the second electronic device in the computer-generated environment, wherein a respective portion of the representation of the user of the second electronic device is oriented based on the second location and the second orientation (e.g., and to face toward a viewpoint of the user of the first electronic device).

In some examples, the representation of the user of the second electronic device is positioned and/or oriented within the portal such that the representation of the second electronic device is maintaining eye contact with the user of the first electronic device in the first computer-generated environment. In some examples, the first electronic device, based on data received from the second electronic device, transposes the user of the second electronic device to the first computer-generated environment, such that the second location and the second orientation of the second electronic device relative to the second origin are mapped to the first computer-generated environment and known to the first electronic device. In some examples, the first electronic device positions the transposed location of the user of the second electronic device to be positioned within the portal and applies a rotation to the transposed orientation of the user of the second electronic device such that the displayed representation of the second electronic device in the portal in the first computer-generated environment is oriented to face toward the viewpoint of the user of the first electronic device.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114*a* oriented towards a face of the user (e.g., eye tracking cameras described below with reference to FIG. 2). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, electronic device 101 also includes external image sensors 114*b* and 114*c* facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114*b* and 114*c*). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114*b* and 114*c*. While a single display 120 is shown, it should be appreciated that display 120 may include a stereo pair of displays.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
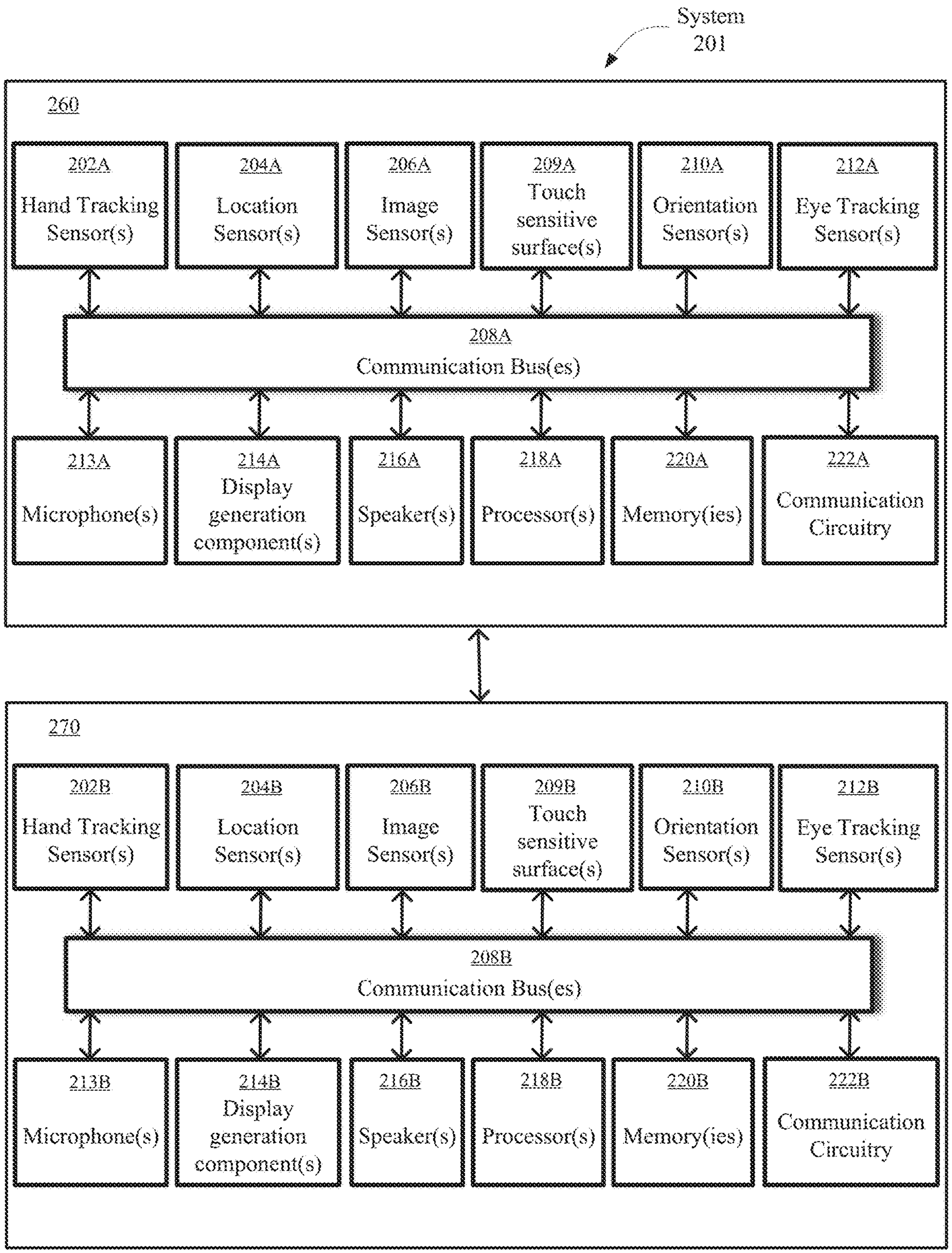
FIG. 2 illustrates a block diagram of an example architecture for a system according to some examples of the disclosure.

FIG. 2 illustrates a block diagram of an example architecture for a system 201 according to some examples of the disclosure. In some examples, system 201 includes multiple electronic devices. For example, the system 201 includes a first electronic device 260 and a second electronic device 270, wherein the first electronic device 260 and the second electronic device 270 are in communication with each other. In some examples, the first electronic device 260 and/or the second electronic device 270 are a portable device, an auxiliary device in communication with another device, a head-mounted display, etc., respectively. In some examples, the first electronic device 260 and the second electronic device 270 correspond to electronic device 101 described above with reference to FIG. 1.

As illustrated in FIG. 2, the first electronic device 260 and the second electronic device 270 optionally include various sensors, such as one or more hand tracking sensors 202A/202B, one or more location sensors 204A/204B, one or more image sensors 206A/206B (optionally corresponding to internal image sensors 114*a* and/or external image sensors 114*b* and 114*c* in FIG. 1), one or more touch-sensitive surfaces 209A/209B, one or more motion and/or orientation sensors 210A/210B, one or more eye tracking sensors 212A/212B, one or more microphones 213A/213B or other audio sensors, one or more body tracking sensors (e.g., torso and/or head tracking sensors), one or more display generation components 214A/214B, optionally corresponding to display 120 in FIG. 1, one or more speakers 216A/216B, one or more processors 218A/218B, one or more memories 220A/220B, and/or communication circuitry 222A/222B. One or more communication buses 208A/208B are optionally used for communication between the above-mentioned components of the electronic devices 260 and 270.

Communication circuitry 222A/222B optionally includes circuitry for communicating with electronic devices, networks, such as the Internet, intranets, a wired network and/or a wireless network, cellular networks, and wireless local area networks (LANs). Communication circuitry 222A/222B optionally includes circuitry for communicating using near-field communication (NFC) and/or short-range communication, such as Bluetooth®.

Processor(s) 218A/218B include one or more general processors, one or more graphics processors, and/or one or more digital signal processors. In some examples, memory 220A/220B is a non-transitory computer-readable storage medium (e.g., flash memory, random access memory, or other volatile or non-volatile memory or storage) that stores computer-readable instructions configured to be executed by processor(s) 218A/218B to perform the techniques, processes, and/or methods described below. In some examples, memory 220A/220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214A/214B include a single display (e.g., a liquid-crystal display (LCD), organic light-emitting diode (OLED), or other types of display). In some examples, display generation component(s) 214A/214B include multiple displays. In some examples, display generation component(s) 214A/214B can include a display with touch capability (e.g., a touch screen), a projector, a holographic projector, a retinal projector, a transparent or translucent display, etc. In some examples, the first and second electronic devices 260 and 270 include touch-sensitive surface(s) 209A/209B, respectively, for receiving user inputs, such as tap inputs and swipe inputs or other gestures. In some examples, display generation component(s) 214A/214B and touch-sensitive surface(s) 209A/209B form touch-sensitive display(s) (e.g., a touch screen integrated with electronic devices 260 and 270 or external to electronic devices 260 and 270 that is in communication with electronic devices 260 and 270).

Electronic devices 260 and 270 optionally include image sensor(s) 206A/206B. Image sensors(s) 206A/206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A/206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A/206B also optionally include one or more cameras configured to capture movement of physical objects in the real-world environment. Image sensor(s) 206A/206B also optionally include one or more depth sensors configured to detect the distance of physical objects from electronic devices 260 and 270. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic devices 260 and 270 use CCD sensors, event cameras, and depth sensors in combination to detect the physical environment around electronic devices 260 and 270. In some examples, image sensor(s) 206A/206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic devices 260 and 270 use image sensor(s) 206A/206B to detect the position and orientation of electronic devices 260 and 270 and/or display generation component(s) 214A/214B in the real-world environment. For example, electronic devices 260 and 270 use image sensor(s) 206A/206B to track the position and orientation of display generation component(s) 214A/214B relative to one or more fixed objects in the real-world environment.

In some examples, electronic devices 260 and 270 include microphone(s) 213A/213B or other audio sensors. Electronic devices 260 and 270 optionally use microphone(s) 213A/213B to detect sound from the user and/or the real-world environment of the user. In some examples, microphone(s) 213A/213B include an array of microphones (a plurality of microphones) that optionally operate in tandem, such as to identify ambient noise or to locate the source of sound in space of the real-world environment.

Electronic devices 260 and 270 include location sensor(s) 204A/204B for detecting a location of electronic devices 260 and 270 and/or display generation component(s) 214A/214B. For example, location sensor(s) 204A/204B can include a global positioning system (GPS) receiver that receives data from one or more satellites and allows electronic devices 260 and 270 to determine the devices' absolute positions in the physical world.

Electronic devices 260 and 270 include orientation sensor(s) 210A/210B for detecting orientation and/or movement of electronic devices 260 and 270 and/or display generation component(s) 214A/214B. For example, electronic devices 260 and 270 use orientation sensor(s) 210A/210B to track changes in the position and/or orientation of electronic devices 260 and 270 and/or display generation component(s) 214A/214B, such as with respect to physical objects in the real-world environment. Orientation sensor(s) 210A/210B optionally include one or more gyroscopes and/or one or more accelerometers.

Electronic devices 260 and 270 include hand tracking sensor(s) 202A/202B and/or eye tracking sensor(s) 212A/212B (and/or other body tracking sensor(s), such as leg, torso and/or head tracking sensor(s)), in some examples. Hand tracking sensor(s) 202A/202B are configured to track the position/location of one or more portions of the user's hands, and/or motions of one or more portions of the user's hands with respect to the extended reality environment, relative to the display generation component(s) 214A/214B, and/or relative to another defined coordinate system. Eye tracking sensor(s) 212A/212B are configured to track the position and movement of a user's gaze (eyes, face, or head, more generally) with respect to the real-world or extended reality environment and/or relative to the display generation component(s) 214A/214B. In some examples, hand tracking sensor(s) 202A/202B and/or eye tracking sensor(s) 212A/212B are implemented together with the display generation component(s) 214A/214B. In some examples, the hand tracking sensor(s) 202A/202B and/or eye tracking sensor(s) 212A/212B are implemented separate from the display generation component(s) 214A/214B.

In some examples, the hand tracking sensor(s) 202A/202B (and/or other body tracking sensor(s), such as leg, torso and/or head tracking sensor(s)) can use image sensor(s) 206A/206B (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensors 206A/206B are positioned relative to the user to define a field of view of the image sensor(s) 206A/206B and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212A/212B includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic devices 260 and 270 are not limited to the components and configuration of FIG. 2, but can include fewer, other, or additional components in multiple configurations. In some examples, system 201 can be implemented in a single device. A person or persons using electronic devices 260/270, is optionally referred to herein as a user or users of the device(s).

Attention is now directed towards interactions between users who are communicating using portals displayed in a computer-generated environment (e.g., a three-dimensional environment) presented at one or more electronic devices (e.g., corresponding to electronic devices 260 and 270). In some examples, as described below, a portal corresponds to a virtual object (e.g., a two-dimensional or three-dimensional virtual object) presented by an electronic device that enables a user of the electronic device to visually communicate with another user. For example, the portal includes a representation (e.g., computer-generated representation) of the other user. As discussed below, when displaying the portal that includes the representation of the other user in the computer-generated environment, it may be desirable to provide systems and methods for enabling eye contact to be maintained between the users (e.g., via their respective representations in their respective portals). Additionally, as discussed herein below, communication between users using portals does not create spatial truth (e.g., a simulation of user interactions who are both located in a same physical environment) between the users' respective computer-generated environments. Accordingly, by not providing the mechanisms discussed below for maintaining eye contact while users are communicating using portals would likely result in the users' viewpoints, and thus their eye(s), not being aligned, which would decrease overall user experience.

Figure 3A:
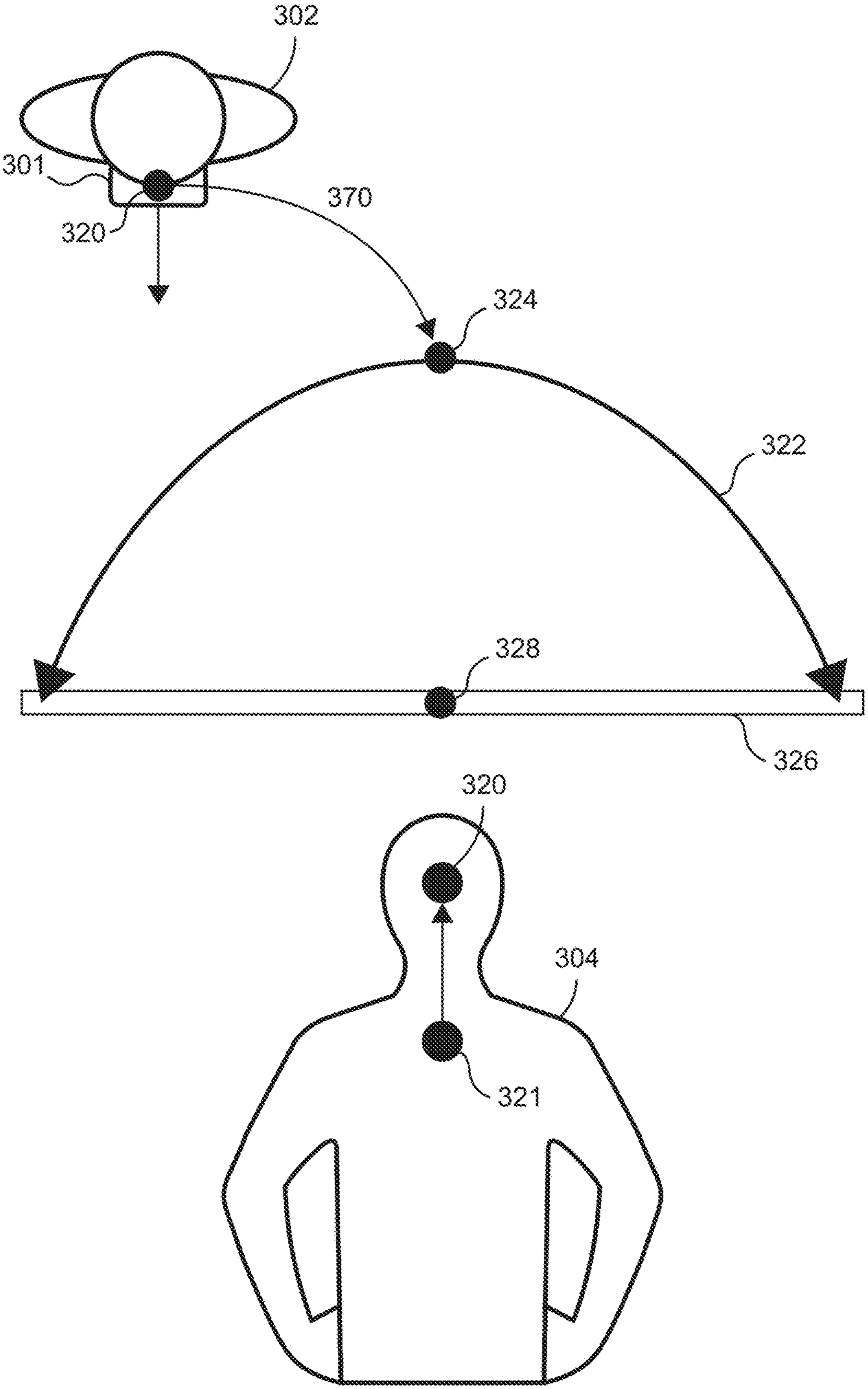
FIGS. 3A-3B illustrate example approaches for positioning a representation of a user of an electronic device within a portal according to some examples of the disclosure.
Figure 3B:
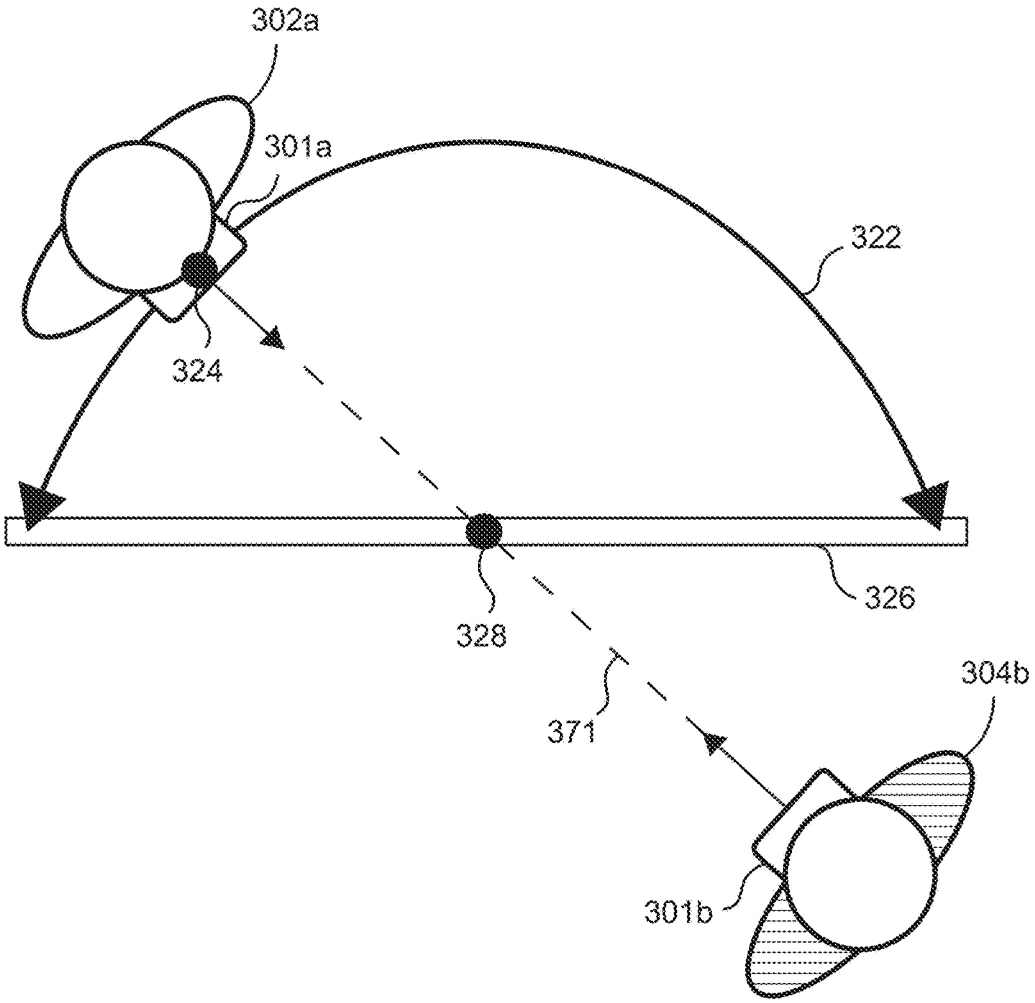

FIGS. 3A-3B illustrate example approaches for positioning a representation of a user of an electronic device within a portal according to some examples of the disclosure. As discussed herein, users may visually communicate with one another in a three-dimensional environment using portals presented at electronic devices associated with the users. In some examples, a portal is presented in a three-dimensional environment when initiating a video call between users. In such an instance, though a representation of a respective user is rendered in three-dimensional space within the three-dimensional environment, the representation of the respective user is not necessarily a spatial representation, such as an avatar or other three-dimensional rendering, that is configured to move locations and/or rotate in the three-dimensional environment based on movement of the respective user, as discussed below.

As shown in FIG. 3A, in some examples, a portal 326 refers to a virtual object through which a respective user may visually communicate with another user in a three-dimensional environment. For example, as shown in FIG. 3A, the portal 326 includes a representation 302 of a user 304. In some examples, the representation 302 corresponds to a computer-generated representation of the user 304. For example, the representation 302, when viewed through/via the portal 326, is a two-dimensional representation, such as a two-dimensional character, cartoon, avatar, or other user-selected two-dimensional representation. In some examples, the representation 302 corresponds to one or more images of the user 304 in a camera feed captured by one or more cameras of electronic device 301. For example, the representation 302 corresponds to a live video feed of the user 304. In other examples, the representation 302, when viewed through/via the portal 326, is a three-dimensional representation, such as a three-dimensional character, cartoon, avatar, or other user-selected three-dimensional representation. It should be understood that, in the example of FIG. 3A, though the representation 302 is illustrated as including the electronic device 301 (e.g., the electronic device 301 is mounted on a head of the representation of the user), the representation 302 need not include the electronic device 301. It should also be understood that, in some examples, the representation 302 is not necessarily displayed in and/or visible in a computer-generated environment when the representation 302 is not viewed (e.g., by another user) through the portal 326. In such instances, the other user (e.g., such as second user 304*b* in FIG. 3B below) may instead see their own physical environment and/or computer-generated environment.

In some examples, the representation 302 of the user 304 is presented within the portal 326 by referencing (e.g., pinning, positioning, tying, locking, clamping) the representation 302 relative to a "stage" 324 of the portal 326. For example, as shown in FIG. 3A, the stage 324 defines a plurality of locations within the portal 326 at which the representation 302 may be positioned, such as according to a parabolic or angular arrangement of locations, as represented by curve 322. It should be understood that, though a parabolic arrangement of placement locations is shown for the stage 324 in FIG. 3A, alternative arrangements are possible, such as rectangular, radial, linear, etc. In some examples, the representation 302 of the user 304 is referenced relative to the stage 324 of the portal 326 at a pin point 320 of the representation 302 of the user 304, as discussed in more detail below.

In some examples, the pin point 320 of the representation 302 is determined based on skeletal data corresponding to the user 304. For example, the electronic device 301 is configured to track and map (e.g., via one or more sensors and/or cameras of the electronic device 301) particular motion of the user 304, including locations of particular portions of the user 304. In some examples, as shown in FIG. 3A, the electronic device 301 determines the pin point 320 based on a position of the eye(s) of the user 304 and a position of a particular thoracic vertebra (e.g., T7 vertebra or other vertebra) on the user's spine. For example, the pin point 320 may be positioned offset relative to a location on the spine by a respective distance, aligned with the spine, corresponding to a distance between the location on the spine and the eye(s) of the user. Accordingly, as indicated in FIG. 3A, the pin point 320 of the representation 302 corresponds to the distance between the particular thoracic vertebra and the eye(s) of the user 304. As shown in FIG. 3A, once the pin point 320 of the representation 302 is determined, the pin point 320 is pinned or anchored (e.g., represented via arrow 370) to the stage 324 (e.g., positioned as a default to a center of the parabolic curve 322). In this way, the representation 302 of the user 304 remains visible to another user, as discussed below, through the portal 326 and oriented to face forward through the portal 326 and toward the other user, such as through a center 328 of the portal 326, as similarly shown in FIG. 3B. For example, as shown in FIG. 3B, representation 302*a* of the user 304 in FIG. 3A is positioned at the stage 324 (e.g., via the pinning of the pin point 320 as discussed above) along the curve 322, which enables a second user 304*b*, via electronic device 301*b*, to visually communicate with the user 304 who is using electronic device 301*a*. In the example of FIG. 3B, the electronic devices 301*a* and 301*b* are in communication with each other. Additionally, in the example of FIG. 3B, the portal 326 that includes the representation 302*a* of the user 304 in FIG. 3A is displayed in a three-dimensional environment that is presented at the electronic device 301*b*, as similarly discussed below.

In FIG. 3B, the portal 326 including the representation 302*a* is displayed by the electronic device 301*b* (e.g., worn on a head of the second user 304*b*) in response to the electronic device 301*b* detecting a request to display the portal 326 in the three-dimensional environment presented by the electronic device 301*b*. In some examples, as discussed below, the request is detected by the electronic device 301*a* and transmitted to the electronic device 301*b* or is detected by the electronic device 301*b* (e.g., via user input provided by the second user of electronic device 301*b*). In some examples, as shown in FIG. 3B, not only is it desirable to position the representation 302*a* within the portal 326 to remain visible to the second user 304*b* (e.g., by using the stage 324 as discussed above), but it may also be desirable to orient the representation 302*a* within the portal 326 such that the representation 302*a* is maintaining eye contact with the second user 304*b* (e.g., the eye(s) of the representation 302*a* are aligned with the eye(s) of the second user 304*b*, as indicated by dashed line 371). Attention is now directed towards methods for positioning a representation of a respective user within a portal for maintaining eye contact with another user in a three-dimensional environment.

FIGS. 4A-4I illustrate example approaches for positioning a representation of a first user within a portal for maintaining eye contact with a second user of an electronic device in a computer-generated environment according to some examples of the disclosure. In some examples, a first electronic device 460 may present a three-dimensional environment 450A, and a second electronic device 470 may present a three-dimensional environment 450B. The first electronic device 460 and the second electronic device 470 may be similar to electronic device 101 or electronic devices 260/270, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses), respectively. In some examples, the first electronic device 460 is configured to communicate with the second electronic device 470. In the example of FIGS. 4A-4I, a first user 404*a* is optionally wearing the first electronic device 460, as shown in top-down view 455A, and a second user 404*b* is optionally wearing the second electronic device 470, as shown in top-down view 455B, such that the three-dimensional environments 450A/450B can be defined by X, Y and Z axes as viewed from a perspective of the electronic devices (e.g., a viewpoint associated with the users of the electronic devices 460/470).

Figure 4A:
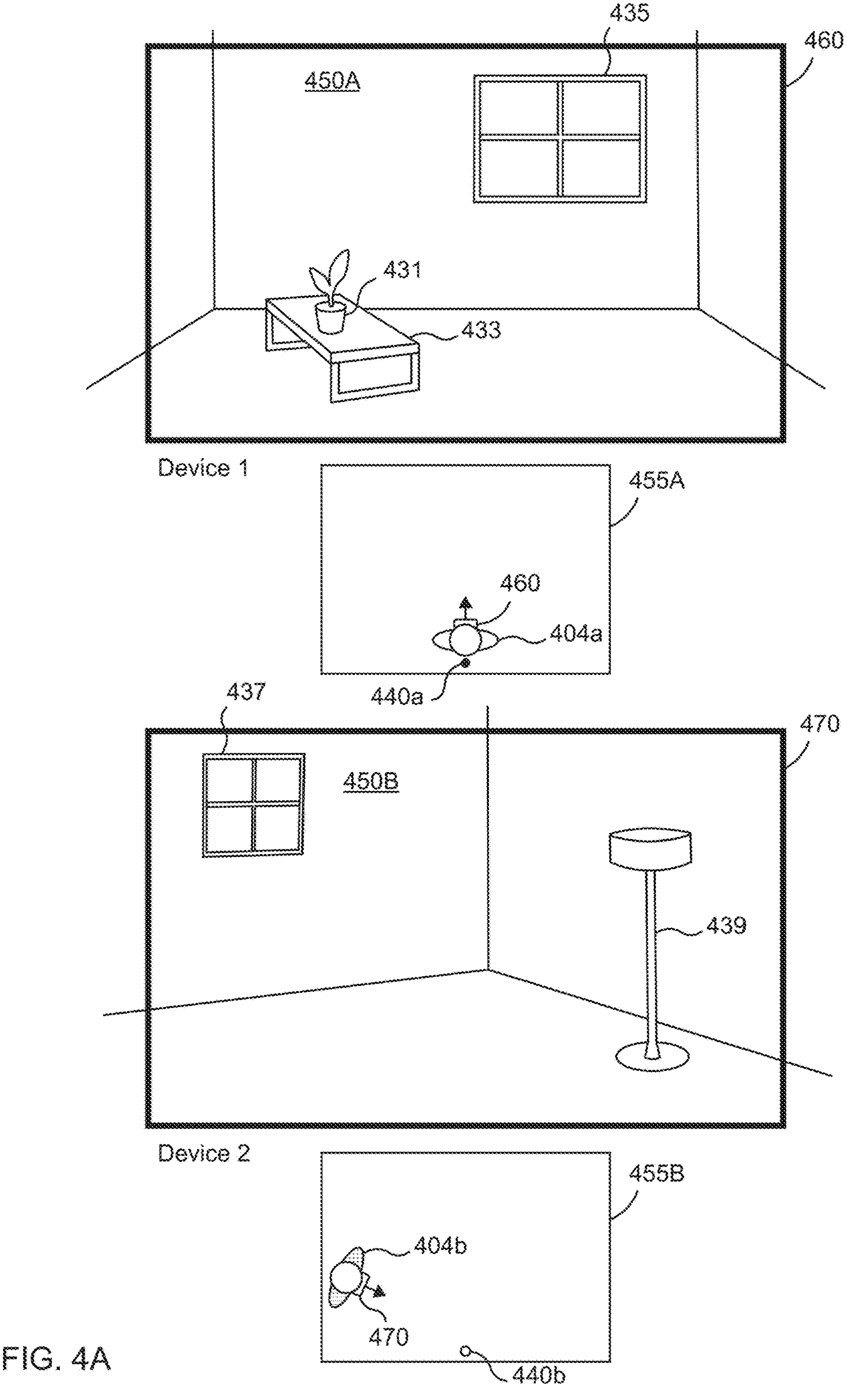
FIGS. 4A-4I illustrate example approaches for positioning a representation of a first user within a portal for maintaining eye contact with a second user of an electronic device in a computer-generated environment according to some examples of the disclosure.

As shown in FIG. 4A, the first electronic device 460 may be in a first physical environment that includes a coffee table 433, a houseplant 431 and a window 435. Thus, the three-dimensional environment 450A presented using the first electronic device 460 optionally includes captured portions of the first physical environment surrounding the first electronic device 460, such as representations of the coffee table 433, the houseplant 431 and the window 435. Similarly, the second electronic device 470 may be in a second physical environment, different from the first physical environment (e.g., separate from the first physical environment), that includes a floor lamp 439 and a window 437. Thus, the three-dimensional environment 450B presented using the second electronic device 470 optionally includes captured portions of the second physical environment surrounding the second electronic device 470, such as representations of the floor lamp 439 and the window 437. Additionally, the three-dimensional environments 450A and 450B may include representations of the floor, ceiling, and walls of the room in which the first electronic device 460 and the second electronic device 470 are located, respectively.

In some examples, as shown in FIG. 4A, the electronic devices 460/470 (e.g., including the users 404*a*/440*b*) have respective positions and/or orientations relative to a world origin in their respective physical environments. For example, as shown in the top-down view 455A, the first electronic device 460 is positioned at a first location and has a first orientation (e.g., indicated by the directionality of the arrow extending from the first electronic device 460) relative to first origin 440*a* in the first physical environment. Similarly, as shown in the top-down view 455B in FIG. 4A, the second electronic device 470 is positioned at a second location, different from the first location, and has a second orientation (e.g., indicated by the directionality of the arrow extending from the second electronic device 470), different from the first orientation, relative to a second origin 440*b* in the second physical environment. In some examples, as shown in FIG. 4A, because the first electronic device 460 and the second electronic device 470 are worn on a head of the user 404*a* and the user 404*b*, respectively, the positions and orientations of the first electronic device 460 and the second electronic device 470 are based on (e.g., are controlled by) the positions and orientations of the users 404*a* and 404*b*, respectively. In some examples, the first origin 440*a* and the second origin 440*b* are arbitrarily defined within the first and second physical environments, respectively. Additionally, in some examples, the first origin 440*a* and the second origin 440*b* correspond to the same location within the first physical environment and the second physical environment (e.g., independent of the positions and/or orientations of the first electronic device 460 and the second electronic device 470).

Figure 4B:
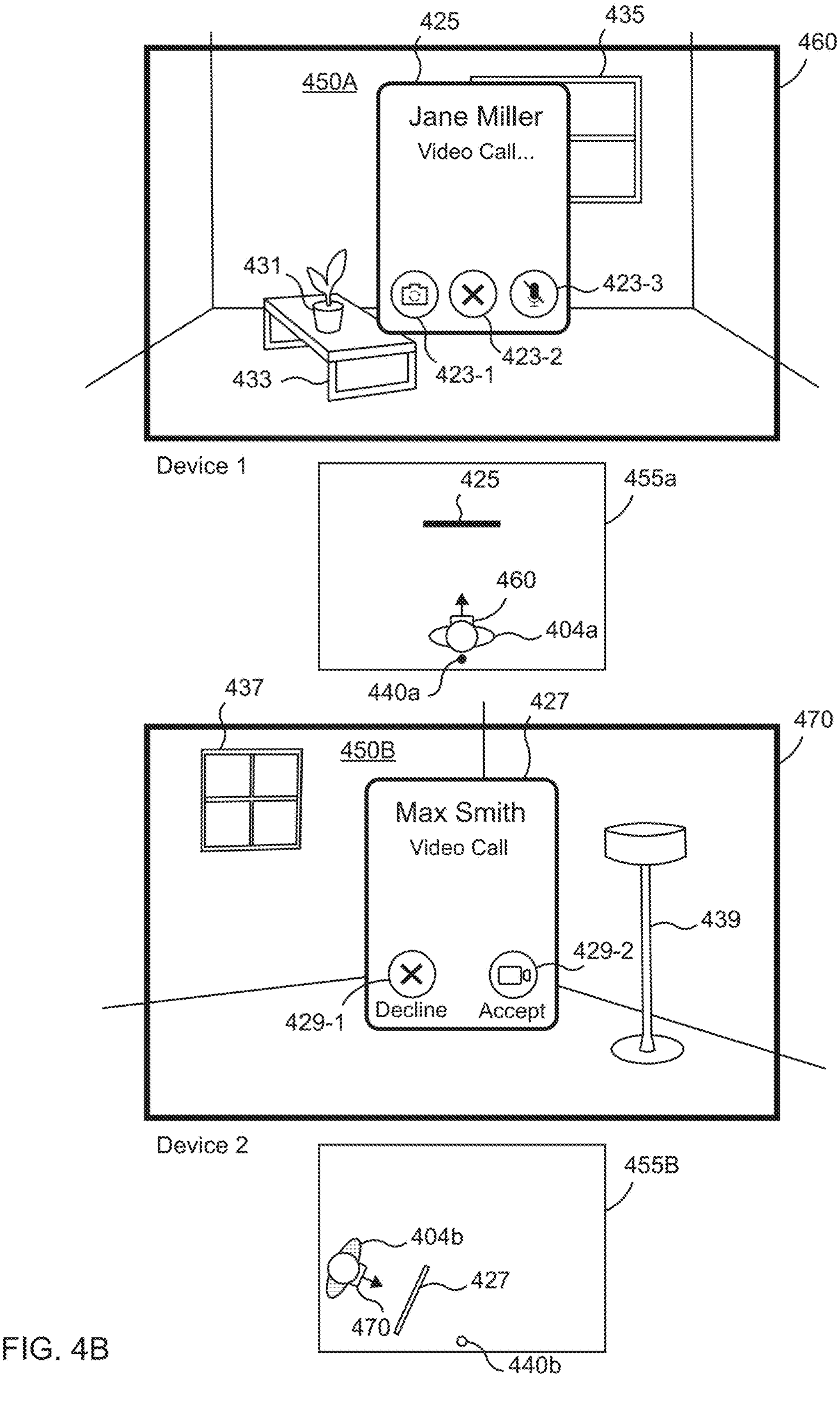

From FIG. 4A to FIG. 4B, the first electronic device 460 detects a request to display a portal in the three-dimensional environment 450A through which to visually communicate with the user 404*b*. For example, the first electronic device 460 detects, via one or more input devices, an input provided by the user 404*a* for initiating a video call with the user 404*b* of the second electronic device 470 (e.g., selection (e.g., via hand-based and/or gaze-based input) of one or more selectable options within a video calling application running on the first electronic device 460, voice-based input, input directed toward a shortcuts widget, etc.). In some examples, the first electronic device 460 alternatively detects an indication of the request from the second electronic device 470. For example, the second electronic device 470 detects, via one or more input devices, an input provided by the user 404*b* for initiating a video call with the user 404*a* of the first electronic device 460.

As shown in FIG. 4B, in some examples, initiating the video call between the user 404*a* and the user 404*b* includes displaying user interfaces 425 and 427 associated with a video calling application. For example, as shown in FIG. 4B, because the user 404*a* (e.g., Max Smith) provided input to initiate the video call with the user 404*b* (e.g., Jane Miller), the first electronic device 460 displays user interface 425 in the three-dimensional environment 450A indicating that the video call has been initiated (e.g., the first electronic device 460 has transmitted the video call request to the second electronic device 470). In some examples, the user interface 425 includes one or more selectable options corresponding to controls for the video call. For example, the user interface 425 includes a first option 423-1 that is selectable to toggle between camera views (e.g., switch from a front-facing camera view on the first electronic device 460 to a rear-facing camera view, or vice versa), a second option 423-2 that is selectable to cancel the initiation of the video call (e.g., and cease display of the user interface 425), and a third option 423-3 that is selectable to activate or deactivate a microphone of the first electronic device 460 (e.g., to control whether verbal input is captured by the first electronic device 460 and transmitted to the second electronic device 470 as audio). Additionally, as shown in FIG. 4B, in response to receiving the request from the first electronic device 460, the second electronic device 470 displays user interface 427 in the three-dimensional environment 450B corresponding to the request. For example, the user interface 427 corresponds to a notification associated with the incoming video call. In some examples, as shown in FIG. 4B, the user interface 427 includes a first option 429-1 that is selectable to decline the incoming video call (e.g., and cease display of the user interface 427) and a second option 429-2 that is selectable to accept the incoming video call. In FIG.

4B, the second electronic device 470 optionally detects a selection of the second option 429-2 provided by the user 404*b*. For example, the second electronic device 470 detects an air pinch gesture optionally while the gaze of the user 404*b* is directed toward the second option 429-2, an air tap or touch gesture directed to the second option 429-2, a gaze and dwell on the second option 429-2, a verbal command, etc. Alternatively, in some examples, the video call is initiated between the first electronic device 460 and the second electronic device 470 without displaying the user interfaces 425 and 427.

In some examples, when the video call is initiated between the first electronic device 460 and the second electronic device 470 (e.g., and in response to the second electronic device 470 detecting selection of the second option 429-2 in the user interface 427), the first electronic device 460 and the second electronic device 470 initiate a process to display a portal through which the users 404*a* and 404*b* are able to visually communicate with each other. For example, as shown in top-down view 465A in FIG. 4C, the first electronic device 460 determines a position at which to display portal 426*a* in the three-dimensional environment 450A. In some examples, the portal 426*a* is positioned an arbitrary (e.g., predetermined) distance from the viewpoint of the user 404*a* in the three-dimensional environment 450A. In some examples, the portal 426*a* is positioned at a user-selected location and/or a user-selected distance from the viewpoint of the user 404*a* in the three-dimensional environment 450A. In some examples, as previously discussed above, the portal 426*a* enables the user 404*a* to visually communicate with the user 404*b* in the three-dimensional environment 450A (e.g., via a representation of the user 404*b* as discussed herein). It should be understood that, as used herein, visually communicating with another user includes verbally communicating with the other user. For example, a respective representation of a user that is displayed within a portal (e.g., the portal 426*a*) at a first electronic device is accompanied by the presentation of audio (e.g., stereo or spatial audio) that corresponds to the user (e.g., captured via one or more microphones of a second electronic device associated with the user and transmitted to the first electronic device).

Figure 4C:
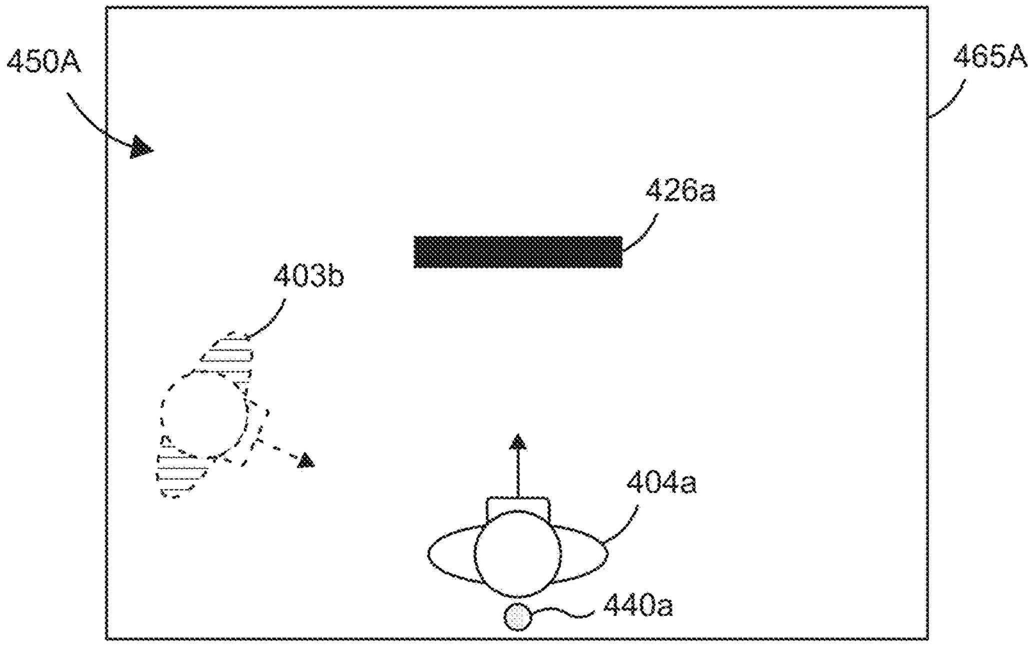

In some examples, as shown in top-down view 465A in FIG. 4C, the first electronic device 460 determines a location in the three-dimensional environment 450A presented at the first electronic device 460 that corresponds to the location of the second origin 440*b* of the second physical environment of the user 404*b*. In some examples, the first electronic device 460 determines the location of the second origin 440*b* relative to the three-dimensional environment 450A based on data provided by the second electronic device 470 (e.g., transmitted directly to the first electronic device 460 from the second electronic device 470 or indirectly to the first electronic device 460 via a server (e.g., a wireless communications terminal) in communication with the first electronic device 460 and the second electronic device 470). As shown in the top-down view 465A via the shading/pattern of the first origin 440*a*, the location in the three-dimensional environment 450A that corresponds to the second origin 440*b* of the second physical environment of the user 404*b* corresponds to (e.g., has been aligned with) the location of the first origin 440*a* in the first physical environment of the user 404*a*.

Additionally, as shown in the top-down view 465A in FIG. 4C, the first electronic device 460 determines a location in the three-dimensional environment 450A that corresponds to the location of the user 404*b* in the second physical environment relative to the second origin 440*b*. In some examples, the first electronic device 460 determines an orientation of the user 404*b* in the three-dimensional environment 450A relative to the second origin 440*b* in the second physical environment of the user 404*b*. In the example of FIG. 4C, the determined location and/or orientation of the user 404*b* relative to the second origin 440*b* in the three-dimensional environment 450A is indicated by skeletal representation 403*b*. As similarly discussed above, the first electronic device 460 optionally determines the location corresponding to the user 404*b* and the orientation of the user 404*b* in the three-dimensional environment 450A relative to the second origin 440*b* based on data provided by the second electronic device 470 (e.g., determined by one or more processors of the second electronic device 470 using sensor and/or camera-based input).

As shown in FIG. 4C, the skeletal representation 403*b*, which indicates the location corresponding to and/or the orientation of the user 404*b* relative to the second origin 440*b* in the three-dimensional environment 450A, is currently not positioned within the portal 426*a* in the three-dimensional environment 450A. Accordingly, the first electronic device 460 determines a placement location for a representation of the user 404*b* (e.g., which will be displayed at a location of the skeletal representation 403*b*) that is within the portal 426*a*.

Figure 4D:
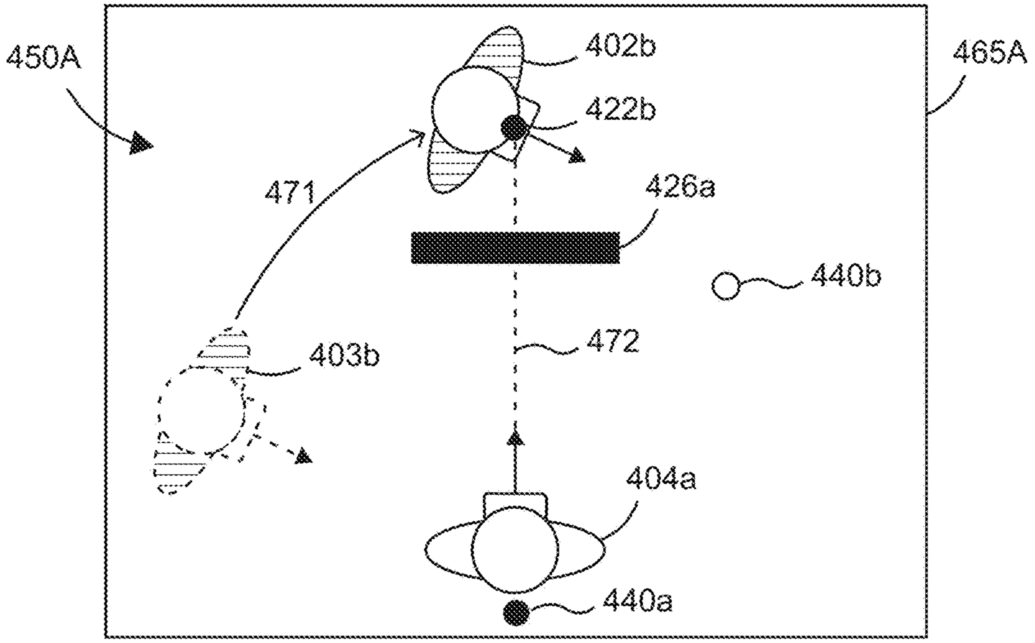

In some examples, as shown in the top-down view 465A in FIG. 4D, the first electronic device 460 selects a placement location for a representation 402*b* of the user 404*b* that is within the portal 426*a* in the three-dimensional environment 450A. In some examples, selecting the placement location that is within the portal 426*a* corresponds to, in the top-down view 465A, moving the skeletal representation 403*b* to the determined position within (e.g., behind) the portal 426*a*. For example, as shown in FIG. 4D, the first electronic device 460 repositions the skeletal representation 403*b* in the direction of arrow 471 in the top-down view 465A, such that the representation 402*b* of the user 404*b* is positioned within the portal 426*a* in the three-dimensional environment 450A. In some examples, as similarly discussed above with reference to FIG. 3A, the first electronic device 460 determines the placement location for the representation 402*b* by pinning the pin point of the representation 402*b* (e.g., corresponding to the eye(s) of the user 404*b* or location offset relative to a portion of the spine of user) to stage 422*b* within the portal 426*a* in the three-dimensional environment 450A. As shown in FIG. 4D, the stage 422*b* corresponds to a center position within (e.g., behind) the portal 426*a*. In some examples, the stage 422*b* may alternatively correspond to a location on a curve (e.g., such as the curve 322 in FIG. 3A as previously discussed above) behind the center of the portal 426*a* and opposite the user 404*a* in the three-dimensional environment 450A. In some examples, as shown in FIG. 4D, when the skeletal representation 403*b* is repositioned according to the stage 422*b* for the representation 402*b* within the portal 426*a*, the location corresponding to the second origin 440*b* is updated in the three-dimensional environment 450A. For example, the location of the second origin 440*b* no longer corresponds to the location of the first origin 440*a* of the first physical environment in the three-dimensional environment 450A, as shown in the top-down view 465A in FIG. 4D, to maintain the same spatial relationship as that between the user 404*b* and the second origin 440*b* in the second physical environment.

In some examples, as shown in the top-down view 465A in FIG. 4D, when the placement location for the representation 402*b* of the user 404*b* within the portal 426*a* in the three-dimensional environment 450A is determined, the representation 402*b* is aligned to a center of the portal 426*a* (e.g., similar to center 328 in FIGS. 3A-3B) and thus aligned to the viewpoint of the user 404*a* in the three-dimensional environment 450A, as indicated by dashed line 472 extending between the representation 402*b* and the user 404*a*.

In FIG. 4D, though the position of the representation 402*b* within the portal 426*a* is aligned to the viewpoint of the user 404*a* in the three-dimensional environment 450A as discussed above, the eye(s) of the representation 402*b* (e.g., corresponding to the eye(s) of the user 404*b*) are not aligned with the viewpoint of the user 404*a*, as indicated by the directionality of the arrow on the representation 402*b*. Accordingly, to align the eye(s) of the representation 402*b* with the eye(s) of the user 404*a* in the three-dimensional environment 450A, thereby enabling the users 404*a* and 404*b* to maintain eye contact when visually communicating using the portal 426*a* in the three-dimensional environment 450A, the first electronic device 460 determines a rotation angle to be applied to the representation 402*b* within the portal 426*a*, as discussed below.

Figure 4E:
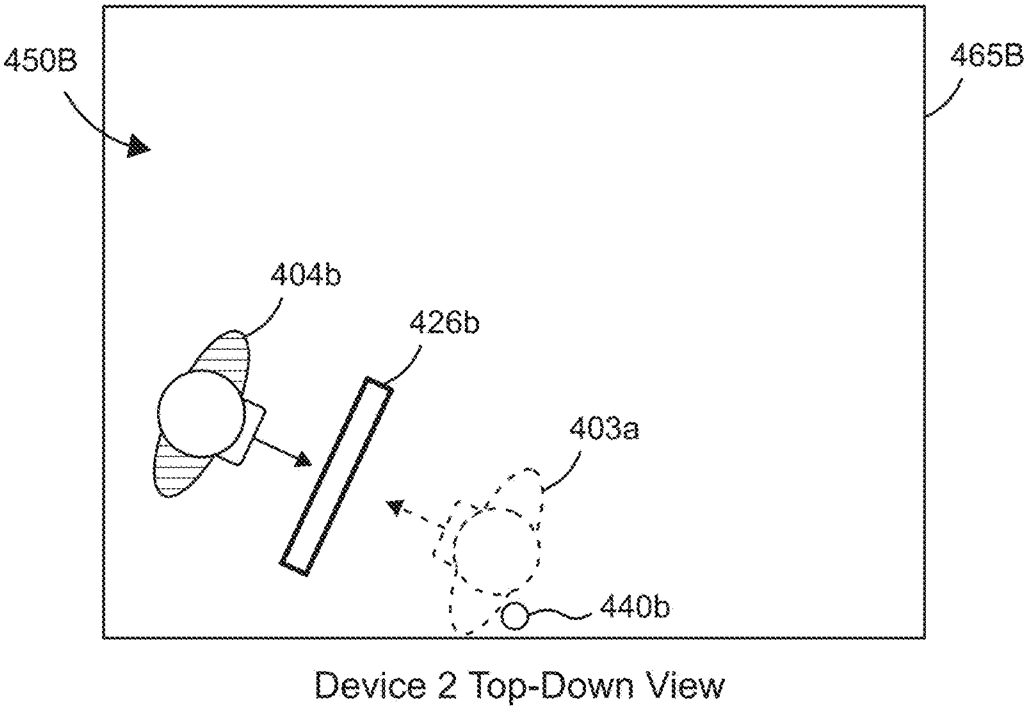

In some examples, the first electronic device 460 determines the rotation angle based on spatial data provided by the second electronic device 470. Particularly, in some examples, the spatial data provided by the second electronic device 470 provides the first electronic device 460 with an indication of a location of a portal through which the user 404*b* visually communicates with the user 404*a* in the three-dimensional environment 450B presented at the second electronic device 470. For example, as shown in top-down view 465B in FIG. 4E, the second electronic device 470 transmits spatial data to the first electronic device 460 that includes an indication of the location in the three-dimensional environment 450B at which the portal 426*b* is displayed relative to the viewpoint of the user 404*b*. As shown in FIG. 4E, the portal 426*b* is optionally located in front of the user 404*b* in the three-dimensional environment 450B. In some examples, the second electronic device 470 positions the portal 426*b* at a predefined (e.g., arbitrary) position in the three-dimensional environment 450B relative to the viewpoint of the user 404*b*. In some examples, the second electronic device 470 positions the portal 426*b* at a user-selected location in the three-dimensional environment 450B (e.g., according to user-defined settings or according to user input selecting the particular location). In some examples, the second electronic device 470 positions the portal 426*b* in the three-dimensional environment 450B based on a spatial context of the three-dimensional environment 450B and/or the second physical environment of the user 404*b*. For example, the second electronic device 470 positions the portal 426*b* at a location that does not correspond to (e.g., overlap with or intersect) locations of objects in the three-dimensional environment 450B (e.g., virtual objects such as application windows, three-dimensional models, virtual video games, etc., or physical objects such as floor lamp 439 in FIG. 4A).

Additionally, in some examples, the spatial data provided by the second electronic device 470 provides the first electronic device 460 with an indication of a placement location within the portal 426*a* for a representation of the user 404*a*, as indicated by skeletal representation 403*a*. For example, in the top-down view 465B in FIG. 4E, the skeletal representation 403*a* represents the skeletal data of the user 404*a* as perceived by the second electronic device 470 in the three-dimensional environment 450B presented at the second electronic device 470. In some examples, the spatial data provided by the second electronic device 470 also provides an indication of an orientation of the representation of the user 404*a* in the three-dimensional environment 450B relative to the viewpoint of the user 404*b*, as represented by the directionality of the arrow on the skeletal representation 403*a*. Accordingly, as similarly discussed above and as shown in the top-down view 465B in FIG. 4E, the skeletal representation 403*a* has a particular position and orientation relative to the second origin 440*b*, which is provided to the first electronic device 460 via the spatial data discussed above.

Figure 4F:
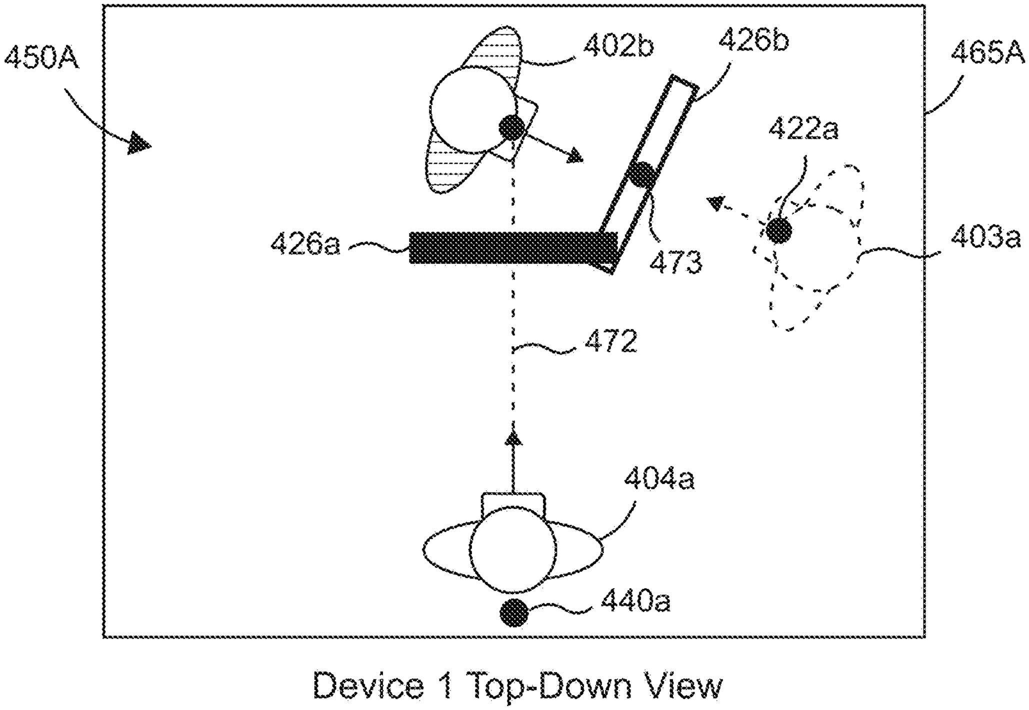
Figure 4G:
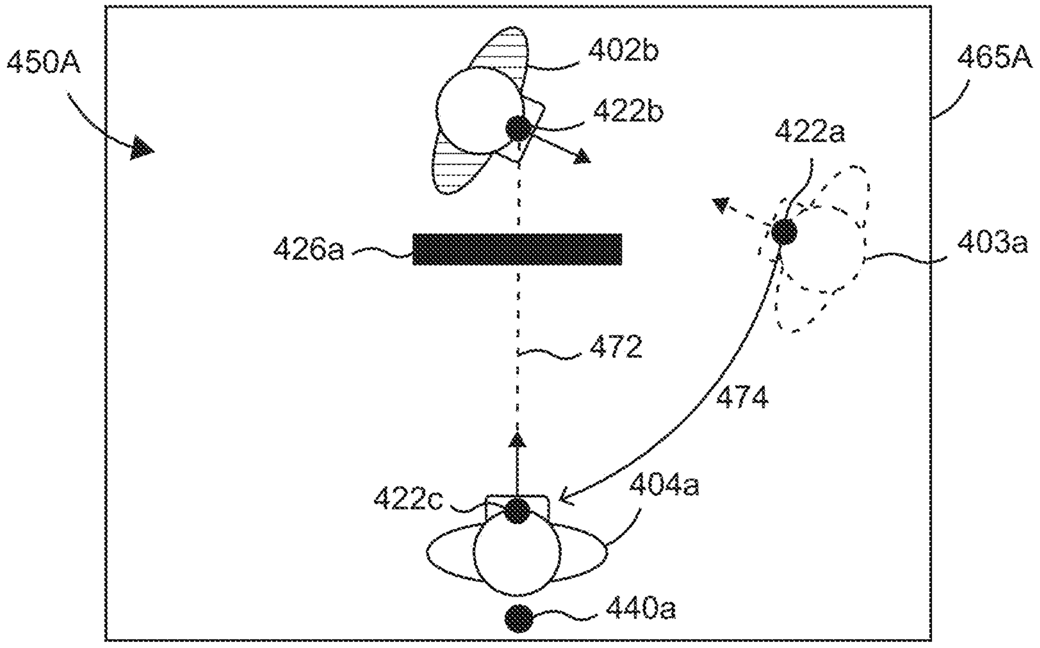

In some examples, as shown in FIG. 4F, when the first electronic device 460 receives the spatial data provided by the second electronic device 470 (e.g., transmitted directly to the first electronic device 460 from the second electronic device 470 or indirectly via a server), the first electronic device 460 identifies locations in the three-dimensional environment 450A that correspond to the portal 426*b* and the skeletal representation 403*a* based on the spatial data. For example, as indicated in the top-down view 465A in FIG. 4F, the portal 426*b* and the skeletal representation 403*a* are mapped to locations in the three-dimensional environment 450A that coincide with the locations of the portal 426*b* and the skeletal representation 403*a* relative to the second origin 440*b* in the top-down view 465B in FIG. 4E (e.g., and relative to the viewpoint of the user 404*b* in FIG. 4E, which corresponds to a viewpoint of the representation 402*b* in the top-down view 465A in FIG. 4F).

In some examples, the first electronic device 460 utilizes the mapped locations of the portal 426*b* and the skeletal representation 403*a* in the three-dimensional environment 450A to determine a stage of the portal 426*b* (e.g., according to which the representation of the user 404*a* is positioned within the portal 426*b* relative to the viewpoint of the user 404*b* in the three-dimensional environment 450B), as described previously with reference to FIG. 3A. For example, as shown in the top-down view 465A in FIG. 4F, the first electronic device 460 calculates stage 422*a* for the skeletal representation 403*a* (e.g., the stage 422*a* is selected to be a predefined distance from a center 473 of the portal 426*b* opposite representation 402*b* and anchored to the skeletal representation 403*a*). Alternatively, in some examples, the second electronic device 470 provides the first electronic device 460 with the location of the stage 422*a* within the portal 426*a* via the spatial data discussed above (e.g., the first electronic device 460 forgoes calculating the stage 422*a* for the skeletal representation 403*a*). In some examples, the determined location of the stage 422*a* in the three-dimensional environment 450A corresponds to a location of the stage within the portal 426*b* in the three-dimensional environment 450B presented at the second electronic device 470 (e.g., relative to the second origin 440*b* in FIG. 4E).

In some examples, once the location of the stage 422*a* of the portal 426*b* is determined in the three-dimensional environment 450A, the first electronic device 460 proceeds to calculate the rotation angle that is to be applied to the representation 402*b* of the user 404*b* in the three-dimensional environment 450A. In some examples, as shown in the top-down view 465A in FIG. 4G, the first electronic device 460 calculates rotation angle 474 between the stage 422*a* and stage 422*c* calculated for the user 404*a* in the three-dimensional environment 450A. For example, the position of the stage 422*c* corresponds to a “true” or “real” position of the stage 422*a* relative to the user 404*a* in the three-dimensional environment 450A (whereas the position of the stage 422*a* is the true or real position for the skeletal representation 403*a* in the three-dimensional environment 450B as shown in FIG. 4E). In some examples, the rotation angle 474 is determined relative to (e.g., centered on) the stage 422*b* for the representation 402*b* of the user 404*b* within the portal 426*a* in the three-dimensional environment 450A discussed above. Finally, as mentioned above, when the first electronic device 460 has calculated the rotation angle 474, the first electronic device 460 applies the rotation angle 474 to the representation 402*b* of the user 404*b*, which enables the representation 402*b* to maintain eye contact with the user 404*a* in the three-dimensional environment 450A, as discussed below with reference to FIG. 4H.

In some examples, the above-discussed methods for positioning and orienting the representation 402*b* of the user 404*b* to maintain eye contact with the user 404*a* at the first electronic device 460 is also performed (e.g., individually performed and/or concurrently performed) by the second electronic device 470. For example, the above steps discussed from the perspective of the first electronic device 460 are also performed from the perspective of the second electronic device 470. Particularly, the second electronic device 470 follows the above-described steps for positioning and orienting a representation 402*a* of the user 404*a* in the three-dimensional environment 450B that enables the representation 402*b* to maintain eye contact with the user 404*b* at the second electronic device 470, as discussed below.

Figure 4H:
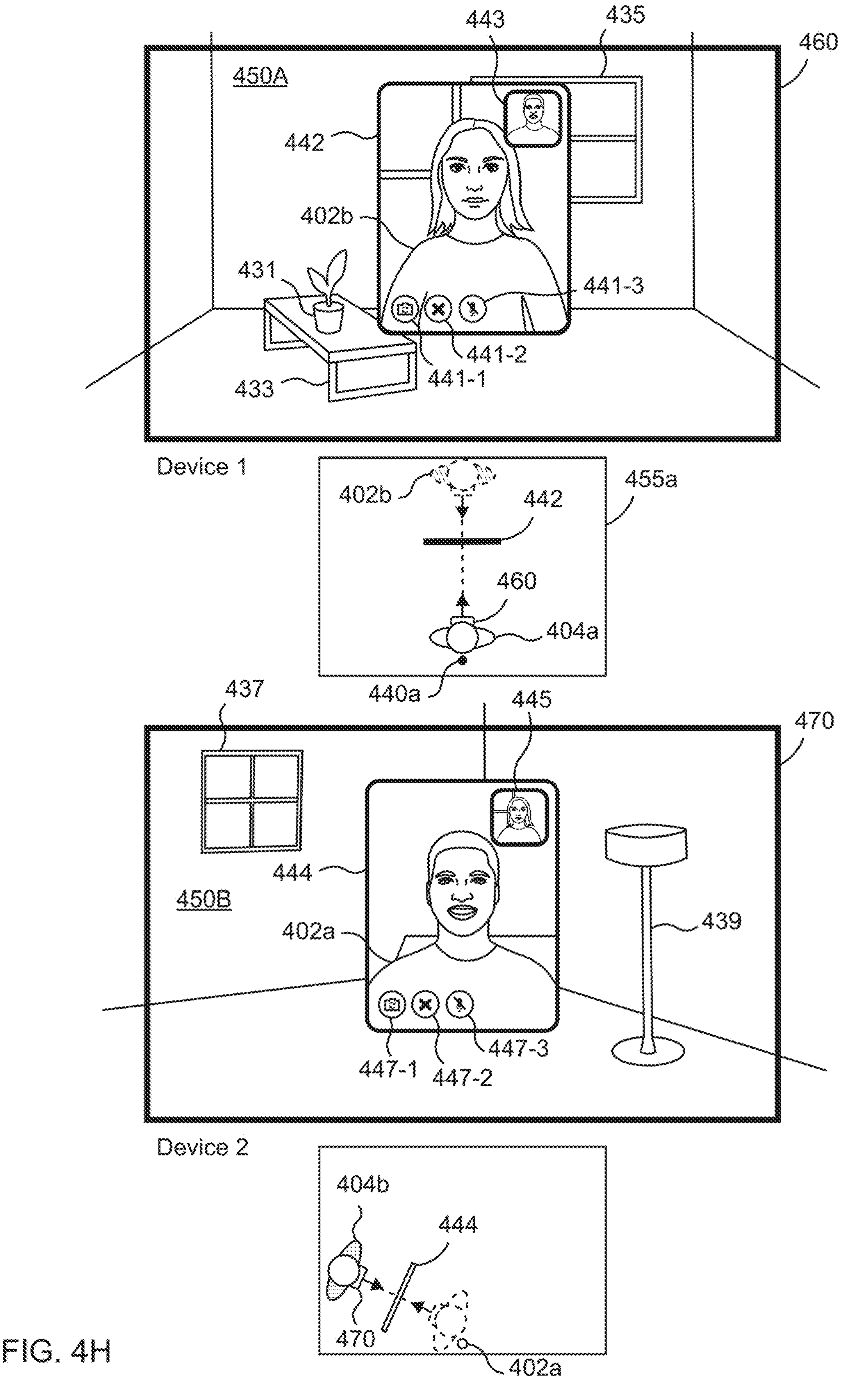

In some examples, as shown in FIG. 4H, once the rotation angle 474 is applied to the representation 402*b* of the user 404*b*, the first electronic device displays video user interface 442 in the three-dimensional environment 450A. In some examples, the video user interface 442 corresponds to the portal 426*a* discussed above. As shown in FIG. 4H, the video user interface 442 includes the representation 402*b* of the user 404*b* (e.g., a two-dimensional or three-dimensional character, cartoon, avatar, or other user-selected representation or a video feed of the user 404*b* captured by one or more cameras of the second electronic device 470). In some examples, as shown in FIG. 4H, a portion of the physical environment of the user 404*b* is included in the video user interface 442 (e.g., surrounding the representation 402*b*). For example, as shown in FIG. 4H, a portion of the second physical environment of the user 404*b* (e.g., present in the video feed of the user 404*b* captured via cameras of the second electronic device 470) that includes a window is visible behind (and partially occluded by) the representation 402*b* of the user 404*b* in the video user interface 442. Additionally, in some examples, the video user interface 442 includes one or more selectable options corresponding to controls for the video call. For example, the video user interface 442 includes a first option 441-1 that is selectable to toggle between camera views (e.g., switch from a front-facing camera view on the first electronic device 460 to a rear-facing camera view, or vice versa), a second option 441-2 that is selectable to end the video call (e.g., and cease display of the video user interface 442), and a third option 441-3 that is selectable to activate or deactivate a microphone of the first electronic device 460 (e.g., to control whether verbal input is captured by the first electronic device 460 and transmitted to the second electronic device 470 as audio). In some examples, as shown in FIG. 4H, the video user interface 442 includes window 443. In some examples, the window 443 provides a video feed captured via one or more rear-facing cameras of the first electronic device 460 (e.g., enabling the user 404*a* to view a representation of themself).

Additionally, in some examples, as shown in FIG. 4H, the second electronic device 470 displays video user interface 444 in the three-dimensional environment 450B. In some examples, the video user interface 444 corresponds to the portal 426*b* discussed above. As shown in FIG. 4H, the video user interface 444 includes the representation 402*a* of the user 404*a*, similar to the representation 402*b* discussed above. As similarly discussed above, in some examples, a portion of the physical environment of the user 404*a* is included in the video user interface 444 (e.g., surrounding the representation 402*a*). For example, as shown in FIG. 4H, a portion of the first physical environment of the user 404*a* (e.g., present in the video feed of the user 404*b* captured via cameras of the first electronic device 460) that includes a table is visible behind (and partially occluded by) the representation 402*a* of the user 404*a* in the video user interface 444. Additionally, in some examples, as shown in FIG. 4H, the video user interface 444 includes one or more selectable options corresponding to controls for the video call. For example, the video user interface 444 includes first option 447-1 (e.g., similar to the first option 441-1 discussed above), second option 447-2 (e.g., similar to the second option 441-2 discussed above), and third option 447-3 (e.g., similar to the third option 441-3 discussed above). In some examples, the video user interface 444 includes window 445 (e.g., similar to the window 443 discussed above) that provides a video feed captured via one or more rear-facing cameras of the second electronic device 470 (e.g., enabling the user 404*b* to view a representation of themselves).

In some examples, as shown in FIG. 4H, when the video user interface 442 is displayed in the three-dimensional environment 450A, the eye(s) of the representation 402*b* within the video user interface 442 are oriented to face toward (e.g., are aligned with) the viewpoint of the user 404*a* of the first electronic device 460 (e.g., such that the representation 402*b* is maintaining eye contact with the user 404*a*, as illustrated in the top-down view 455A). Additionally, in FIG. 4H, when the video user interface 444 is displayed in the three-dimensional environment 450B, the eye(s) of the representation 402*a* within the video user interface 444 are oriented to face toward (e.g., are aligned with) the viewpoint of the user 404*b* of the second electronic device 470 (e.g., such that the representation 402*a* is maintaining eye contact with the user 404*b*, as illustrated in the top-down view 455B).

Figure 4I:
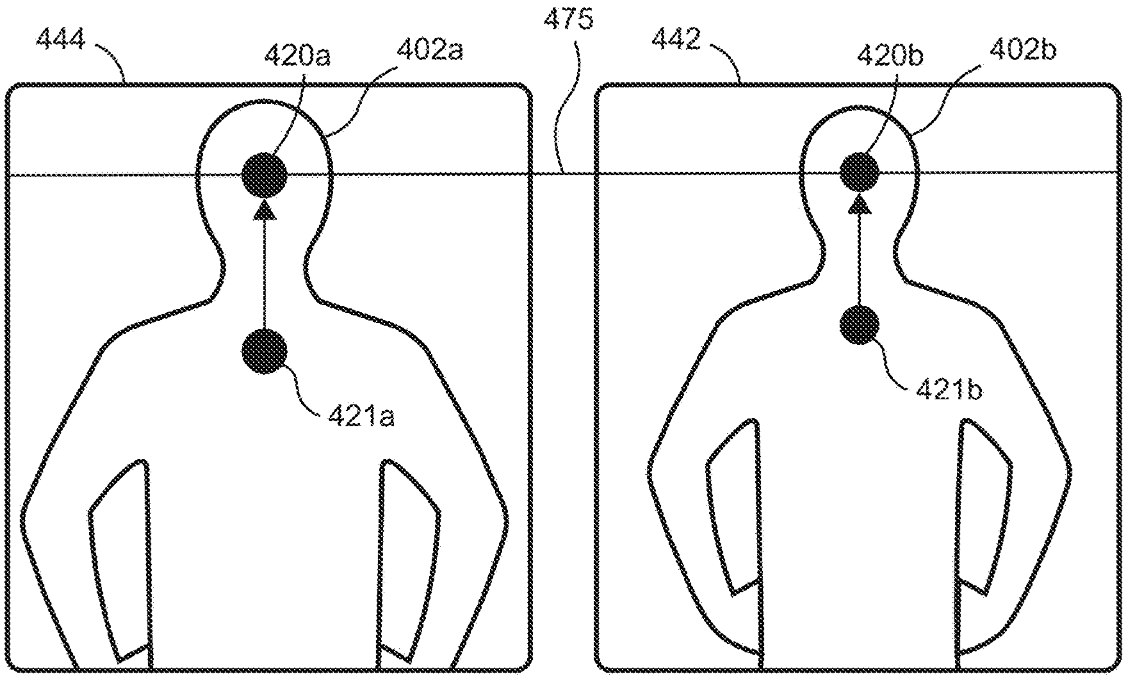

Further, in some examples, aligning the eye(s) of the users 404*a* and 404*b* (e.g., via their respective representations 402*a* and 402*b*) includes positioning the users 404*a* and 404*b* to be at a same eye level. In some examples, as shown in FIG. 4I, the first electronic device 460 and the second electronic device 470 position the users 404*a* and 404*b* (e.g., via their respective representations 402*a* and 402*b*) to be at the same eye level using the representations' respective pin points. For example, as indicated by line 475 in FIG. 4I, the pin point 420*a* of the representation 402*a* of the user 404*a* within the video user interface 444 is positioned at the same elevation/height as the pin point 420*b* of the user 404*b* within the video user interface 442. In this way, the users 404*a* and 404*b* maintain eye contact while participating in the video call (e.g., using portals as discussed above) despite differences in physical stature between the users 404*a* and 404*b*. For example, as shown in FIGS. 4H and 4I, the representation 402*b* of the user 404*b* is smaller than (e.g., shorter than) the representation 402*a* of the user 404*a* (e.g., due to the user 404*b* being physically smaller than (e.g., shorter than) the user 404*b*), but aligning the pin points 420*a* and 420*b* allows the users 404*a* and 404*b* to maintain eye contact via their respective portals (e.g., the video user interfaces 444 and 442).

In some examples, while the video user interfaces 442 and 444 are displayed in the three-dimensional environments 450A/450B, the users 404*a* and 404*b* do not experience spatial truth with the representations 402*b* and 402*a* displayed within the video user interface 442 and 444 (e.g., displayed in portals in the three-dimensional environments 450A/450B). For example, as discussed in more detail below, if the user 404*a* moves within the first physical environment, causing the first electronic device 460 to also move within the first physical environment, the second electronic device 470 forgoes moving the video user interface 444 and/or the representation 402*a* in the three-dimensional environment 450B in accordance with the movement of the user 404*a* (and vice versa for movement of the user 404*b* in the second physical environment). However, as discussed below, rotation of the user 404*a* within the first physical environment, which causes the first electronic device 460 to also be rotated within the first physical environment, optionally causes the representation 402*a* within the video user interface 444 to be rotated in accordance with the rotation of the user 404*a,* without necessarily rotating the video user interface 444 in the three-dimensional environment 450B.

Accordingly, as discussed above, positioning and/or orienting a representation of a respective user of a respective electronic device within a portal, through which to visually communicate with the respective user in a computer-generated environment, based on spatial and/or skeletal data provided by the respective electronic device enables users to maintain eye contact when visually communicating using the portal, as one advantage. As another benefit, automatically positioning and/or orienting the representation of the respective user to maintain eye contact with the user reduces and/or prevents the need for input by the user to manually position themself relative to the portal that includes the representation of the respective user, which helps reduce the cognitive burden of the user. Additionally, providing methods for maintaining eye contact between users who are communicating using portals in a computer-generated environment helps simulate real-world communication, thereby improving and enhancing the users' experiences.

It should be understood that the methods discussed above with reference to FIGS. 4C-4G for positioning and orienting the representation 402*b* of the user 404*b* to maintain eye contact with the user 404*a* at the first electronic device 460 (and for positioning and orienting the representation 402*a* of the user 404*a* to maintain eye contact with the user 404*b* at the second electronic device 470) need not be perceptible by (e.g., visible to and/or hearable by) the users 404*a* and 404*b.* For example, in response to detecting the request to initiate a video call between the users 404*a* and 404*b* as discussed above with reference to FIG. 4B, the user 404*a* "sees" the video user interface 442 in the three-dimensional environment 450A presented by the first electronic device 460 and the user 404*b* sees the video user interface 444 in the three-dimensional environment 450B presented by the second electronic device 470, without necessarily seeing or otherwise perceiving the positioning and/or orienting of the representations 402*a* and 402*b* in the manners shown in FIGS. 4C-4G. Additionally, it should be understood that alternative forms of the portals 426*a* and 426*b* may be provided in the three-dimensional environments 450A/450B. For example, the portals 426*a* and 426*b* need not correspond to the particular video user interfaces 442 and 444 shown in FIG. 4H and may alternatively have a different appearance, form, shape, and/or various additional or alternative or fewer user interface elements than those shown.

Figure 5A:
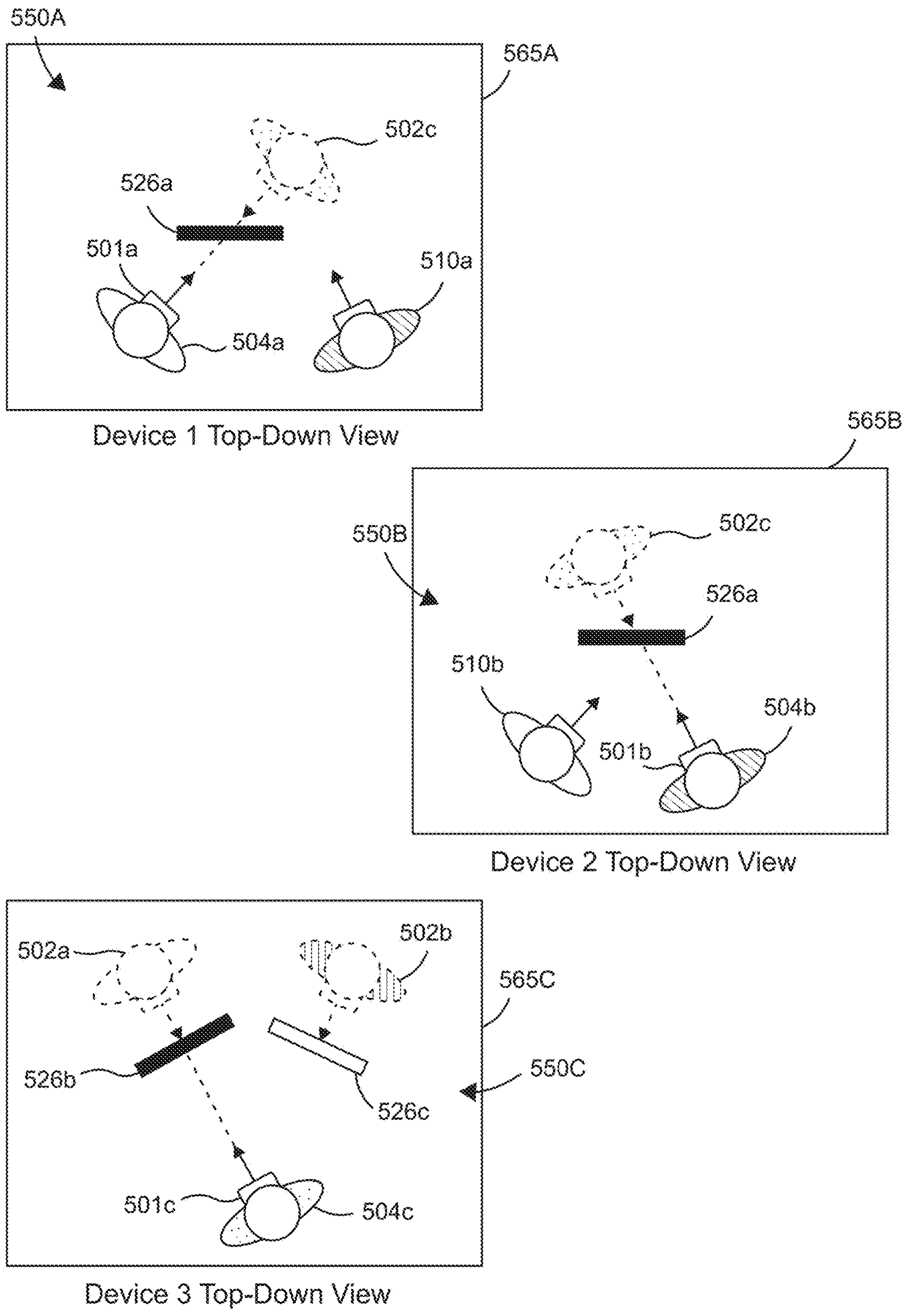
FIGS. 5A-5B illustrate examples of maintaining eye contact among three users who are communicating using portals in a computer-generated environment according to some examples of the disclosure.
Figure 5B:
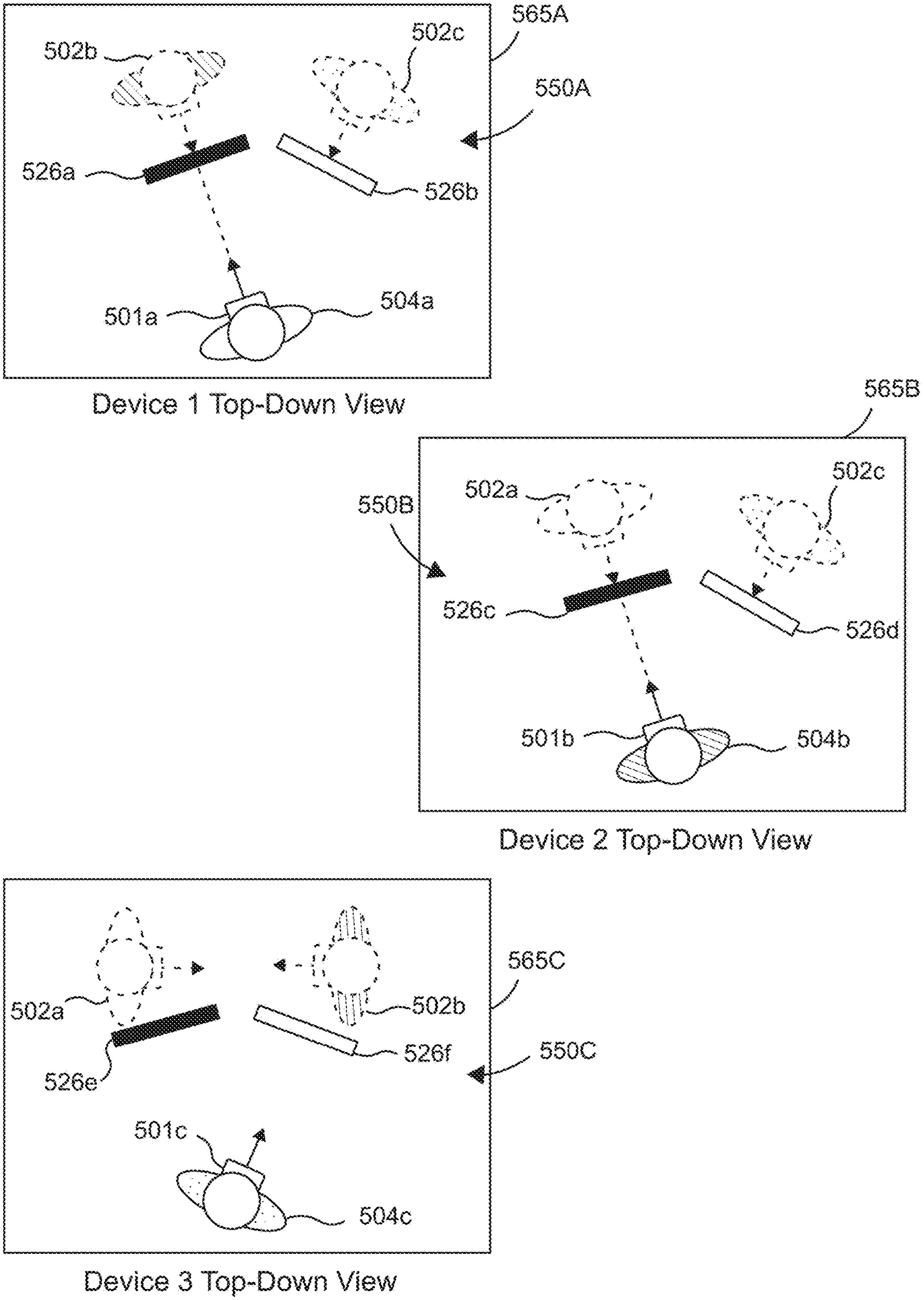

FIGS. 5A-5B illustrate examples of maintaining eye contact among three users who are communicating using portals in a computer-generated environment according to some examples of the disclosure. In some examples, the above-described methods illustrated in FIGS. 4A-4I for automatically positioning and/or orienting representations of users within portals in computer-generated environments for enabling the users to maintain eye contact with each other is able to be applied to more than two users (e.g., three or more users) who desire to visually communicate with each other via portals.

FIG. 5A illustrates an example of three users who are communicating via their respective electronic devices, where one of the users is communicating while in a non-spatial state. For example, as shown in FIG. 5A, a first user 504*a* of a first electronic device 501*a,* a second user 504*b* of a second electronic device 501*b,* and a third user 504*c* of a third electronic device 501*c* are in communication (optionally in a multi-user communication session). In some examples, while the first electronic device 501*a,* the second electronic device 501*b,* and the third electronic device 501*c* are in a multi-user communication session, a three-dimensional environment 550A may be presented using first electronic device 501*a* (as shown in top-down view 565A), a three-dimensional environment 550B may be presented using second electronic device 501*b* (as shown in top-down view 565B), and a three-dimensional environment 550C may be presented using third electronic device 501*c* (as shown in top-down view 565C). In some examples, the electronic devices 501*a*/501*b*/501*c* optionally correspond to electronic devices 460/470 discussed above and/or electronic device 101 in FIG. 1. In some examples, as previously discussed herein, the three-dimensional environments 550A/550B/550C include captured portions of the physical environments in which electronic devices 501*a*/501*b*/501*c* are located. In some examples, the three-dimensional environments 550A/550B/550C are similar to three-dimensional environments 450A/450B described above.

In some examples, the first user 504*a* and the second user 504*b* are participating in the multi-user communication session in a spatial state and the third user 504*c* is participating in the multi-user communication session in a non-spatial state. In some examples, while the first user 504*a* and the second user 504*b* are in the spatial state in the multi-user communication session, the first electronic device 501*a* and the second electronic device 501*b* (e.g., via communication circuitry 222A/222B of FIG. 2) are configured to present a shared three-dimensional environment that includes one or more shared virtual objects (e.g., shared content, such as images, video, audio and the like, representations of user interfaces of applications, three-dimensional models, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices. Additionally, avatars corresponding to the users (e.g., three-dimensional representations of the users) of the first electronic device 501*a* and the second electronic device 501*b* are optionally displayed within the shared three-dimensional environments presented at the two electronic devices. As shown in FIG. 5A, in the top-down view 565A, the first electronic device 501*a* optionally displays an avatar 510*a* corresponding to the user 504*b* of the second electronic device 501*b* within the three-dimensional environment 550A. Similarly, in the top-down view 565B, the second electronic device 501*b* optionally displays an avatar 510*b* corresponding to the user 504*a* of the first electronic device 501*a* within the three-dimensional environment 550B.

In some examples, the avatars 510*a*/510*b* are a spatial representation (e.g., a full-body rendering) of each of the users of the electronic devices 501*b*/501*a*. In some examples, the avatars 510*a*/510*b* are each a representation of a portion (e.g., a rendering of a head, face, head and torso, etc.) of the users of the electronic devices 501*b*/501*a*. In some examples, the avatars 510*a*/510*b* are a user-personalized, user-selected, and/or user-created representation displayed in the three-dimensional environments 550A/550B that is representative of the users of the electronic devices 501*b*/501*a*.

In some examples, while the first electronic device 501*a* and the second electronic device 501*b* are in the multi-user communication session, the avatars 510*a*/510*b* are displayed in the three-dimensional environments 550A/550B with respective orientations that (e.g., initially, such as prior to detecting user input) correspond to and/or are based on orientations of the electronic devices 501*b*/501*a* in the physical environments surrounding the electronic devices 501*b*/501*a*. For example, as shown in the top-down views 565A and 565B in FIG. 5A, in the three-dimensional environment 550A, the avatar 510*a* is displayed with an orientation (e.g., indicated by the directionality of the arrow on the avatar 510*a*) that is based on an orientation of the second electronic device 501*b* worn on the head of the second user 504*b*, and in the three-dimensional environment 550B, the avatar 510*b* is displayed with an orientation (e.g., indicated by the directionality of the arrow on the avatar 510*b*) that is based on an orientation of the first electronic device 501*a* worn on the head of the first user 504*a*. Additionally, as a particular user moves the electronic device in their respective physical environment, the viewpoint of the user changes in accordance with the movement, which may thus also change an orientation and/or position of the user's avatar in the three-dimensional environment presented at the other electronic device.

As mentioned above, the third user 504*c* is in the non-spatial state within the multi-user communication session. Accordingly, as shown in FIG. 5A, the third user 504*c* is represented as a two-dimensional or three-dimensional representation within a portal as discussed above, rather than as a spatial (e.g., and three-dimensional) avatar. For example, a representation of the third user 504*c* is not displayed spatially within the portal, such that movements and/or rotations of the third user 504*c* do not cause the portal to be shifted in the three-dimensional environments 550A/550B presented at the first and second electronic device 501*a* and 501*b*, respectively. As shown in the top-down view 565A in FIG. 5A, representation 502*c* of the third user 504*c* is displayed within (e.g., behind) portal 526*a* through which the first user 504*a* may visually communicate with the third user 504*c* in the three-dimensional environment 550A at the first electronic device 501*a*. In some examples, the portal 526*a* has one or more characteristics of portals 426*a*/426*b* and/or 326 discussed previously above. For example, the portal 526*a* is presented similarly as the video user interfaces 442 and 444 discussed above. Similarly, in some examples, as shown in the top-down view 565B in FIG. 5A, the representation 502*c* of the third user 504*c* is displayed within (e.g., behind) the portal 526*a* through which the second user 504*b* may visually communicate with the third user 504*c* in the three-dimensional environment 550B at the second electronic device 501*b*. In some examples, as similarly discussed above, because the first user 504*a* of the first electronic device 501*a* and the second user 504*b* of the second electronic device 501*b* are in the spatial state in the multi-user communication session, the first user 504*a* and the second user 504*b* view the portal 526*a* as a single object (e.g., a shared virtual object) in their respective three-dimensional environments 550A/550B. For example, the location at which the portal 526*a* is displayed in the three-dimensional environments 550A/550B is consistent between the viewpoints of the users 504*a*/504*b*, as similarly discussed above.

In some examples, as shown in FIG. 5A, because the third user 504*c* is in the non-spatial state in the multi-user communication session, the first user 504*a* and the second user 504*b* are not represented as spatial avatars in the three-dimensional environment 550C presented at the third electronic device 501*c*. Particularly, as shown in the top-down view 565C in FIG. 5A, the first user 504*a* and the second user 504*b* are represented as two-dimensional or three-dimensional representations within portals in the three-dimensional environment 550C. For example, as shown in FIG. 5A, representation 502*a* of the first user 504*a* is displayed within (e.g., behind) portal 526*b* in the three-dimensional environment 550C presented at the third electronic device 501*c* and representation 502*b* of the second user 504*b* is displayed within portal 526*c* in the three-dimensional environment 550C. As shown in the top-down view 565C in FIG. 5A, the portal 526*b* and the portal 526*c* are separately displayed in the three-dimensional environment 550C (e.g., but are still optionally concurrently displayed in the three-dimensional environment 550C).

In some examples, as described above with reference to FIGS. 4A-4I, the first electronic device 501*a*, the second electronic device 501*b*, and the third electronic device 501*c* communicate (e.g., transmit and/or exchange spatial and skeletal data corresponding to their respective users) to maintain eye contact between the user and a given representation of another user at a respective electronic device. In the example of FIG. 5A, because there are three users who are communicating, where the third user 504*c* is in the non-spatial state as discussed above, the three users cannot all simultaneously be maintaining eye contact with one another via their respective representations. Accordingly, as discussed below, eye contact is established between respective users based on the orientation of the third electronic device 501*c* (e.g., the forward direction of the third user 504*c*, who is currently in the non-spatial state (optionally based on the directionality of the head of the third user 504*c*)).

As shown in FIG. 5A, if, at the third electronic device 501*c*, the third user 504*c* is oriented toward the representation 502*a* of the first user 504*a* (e.g., as indicated by the dashed line extending between the third user 504*c* and the representation 502*a* in the top-down view 565C), which causes the third electronic device 501*c* to also be oriented toward the representation 502*a* in the portal 526*b*, when the representation 502*c* of the third user 504*c* is displayed in the three-dimensional environments 550A/550B at the first electronic device and the second electronic device 501*a* and 501*b*, respectively, the representation 502*c* is oriented and/or positioned to have eye contact with the first user 504*a*. For example, as shown in the top-down view 565A in FIG. 5A, the representation 502*c* is oriented to face in the direction of the first user 504*a* in the three-dimensional environment 550A presented at the first electronic device 501*a*, such that the representation 502*c* and the first user 504*a* are maintaining eye contact as similarly discussed above (e.g., as indicated by the dashed line extending between the representation 502*c* and the first user 504*a*). In such an instance, at the second electronic device 501*b* (e.g., such as in the top-down view 565B in FIG. 5A), the representation 502*c* of the third user 504*c* in the portal 526*a* would be oriented to be facing away from the viewpoint of the second user 504*b* and toward the avatar 510*b* corresponding to the first user 504*a* in the three-dimensional environment 550B.

Alternatively, as shown in FIG. 5A, if, at the third electronic device 501*c*, the third user 504*c* is oriented toward the representation 502*b* of the second user 504*b* in the top-down view 565C, which causes the third electronic device 501*c* to also be oriented toward the representation 502*b* in the portal 526*c*, when the representation 502*c* of the third user 504*c* is displayed in the three-dimensional environments 550A/550B at the first electronic device and the second electronic device 501*a* and 501*b*, respectively, the representation 502*c* is oriented and/or positioned to have eye contact with the second user 504*b* (e.g., rather than the first user 504*a* as discussed above). For example, as shown in the top-down view 565B in FIG. 5A, the representation 502*c* is oriented to face in the direction of the second user 504*b* in the three-dimensional environment 550B presented at the second electronic device 501*b*, such that the representation 502*c* and the second user 504*b* are maintaining eye contact as similarly discussed above (e.g., as indicated by the dashed line extending between the representation 502*c* and the second user 504*b*). In such an instance, at the first electronic device 501*a* (e.g., such as in the top-down view 565A in FIG. 5A), the representation 502*c* of the third user 504*c* in the portal 526*a* would be oriented to be facing away from the viewpoint of the first user 504*a* and toward the avatar 510*a* corresponding to the second user 504*b* in the three-dimensional environment 550A.

FIG. 5B illustrates an example of three users who are communicating via their respective electronic devices, where each of the users is communicating while in a non-spatial state. For example, as shown in FIG. 5B, a first user 504*a* of a first electronic device 501*a*, a second user 504*b* of a second electronic device 501*b*, and a third user 504*c* of a third electronic device 501*c* are in communication (optionally in or not in a multi-user communication session). In the example of FIG. 5B, because the first user 504*a*, the second user 504*b*, and the third user 504*c* are in a non-spatial state as similarly discussed above, each user communicates with the other users using portals in the three-dimensional environments displayed at their respective electronic devices. For example, as shown in the top-down view 565A in FIG. 5B, at the first electronic device 501*a*, the second user 504*b* is represented via representation 502*b* in portal 526*a* and the third user 504*c* is represented via representation 502*c* in portal 526*b* in the three-dimensional environment 550A from the viewpoint of the first user 504*a*. Similarly, as shown in the top-down view 565B in FIG. 5B, at the second electronic device 501*b*, the first user 504*a* is represented via representation 502*a* in portal 526*c* and the third user 504*c* is represented via the representation 502*c* in portal 526*d* in the three-dimensional environment 550B from the viewpoint of the second user 504*b*. In some examples, as shown in the top-down view 565C in FIG. 5B, at the third electronic device 501*c*, the first user 504*a* is represented via the representation 502*a* in portal 526*e* and the second user 504*b* is represented via the representation 502*b* in portal 526*f* in the three-dimensional environment 550C from the viewpoint of the third user 504*c*.

In some examples, as similarly discussed above with reference to FIG. 5A, because all three users who are currently communicating are in the non-spatial state (e.g., and are thus communicating via the portals discussed above), eye contact is established between respective users based independently on the orientation of each electronic device 501*a*/501*b*/501*c* (e.g., the forward direction of each user (optionally determined based on the directionality of the head of the user)). For example, in the top-down view 565A in FIG. 5B, the representation 502*b* of the second user 504*b* is oriented and/or positioned to face and/or have eye contact with the first user 504*a* (e.g., as indicated by the dashed line extending between the representation 502*b* and the first user 504*a*) in the three-dimensional environment 550A because the second user 504*b* is oriented to face toward the representation 502*a* of the first user 504*a* in the three-dimensional environment 550B at the second electronic device 501*b* (e.g., such as in the top-down view 565B). As another example, as shown in the top-down view 565B in FIG. 5B, the representation 502*a* of the first user 504*a* is oriented and/or positioned to face and/or have eye contact with the second user 504*b* (e.g., as indicated by the dashed line extending between the representation 502*a* and the second user 504*b*) in the three-dimensional environment 550B because the first user 504*a* is oriented to face toward the representation 502*b* of the second user 504*b* in the three-dimensional environment 550A at the first electronic device 501*a* as discussed above (e.g., such as in the top-down view 565A). In some examples, as shown in the top-down view 565C in FIG. 5B, the representation 502*a* of the first user 504*a* is oriented and/or positioned to face toward the representation 502*b* of the second user 504*b* (e.g., within their respective portals 526*e* and 526*f*) in the three-dimensional environment 550C. As indicated in FIG. 5B and as discussed above, because neither the first user 504*a* in the top-down 565A nor the second user 504*b* in the top-down 565B is oriented to face toward the representation 502*c* of the third user 504*c*, neither the representation 502*a* nor the representation 502*b* is oriented and/or positioned to face and/or have eye contact with the third user 504*c* in the three-dimensional environment 550C at the third electronic device 501*c* (e.g., such as in the top-down view 565C).

It is understood that the examples shown and described herein are merely exemplary and that additional and/or alternative elements may be provided within the three-dimensional environment for initiating communication between users using portals. It should be understood that the appearance, shape, form, and size of each of the various user interface elements and objects shown and described herein are exemplary and that alternative appearances, shapes, forms and/or sizes may be provided. For example, the virtual objects representative of user interfaces (e.g., user interfaces 425 and 427 and/or video user interfaces 442 and 444) may be provided in an alternative shape than a rectangular shape, such as a circular shape, triangular shape, etc. In some examples, the various selectable affordances (e.g., selectable options 423, 429, 441, and/or 447) described herein may be selected verbally via user verbal commands (e.g., "select option" or "select virtual object" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Figure 6:
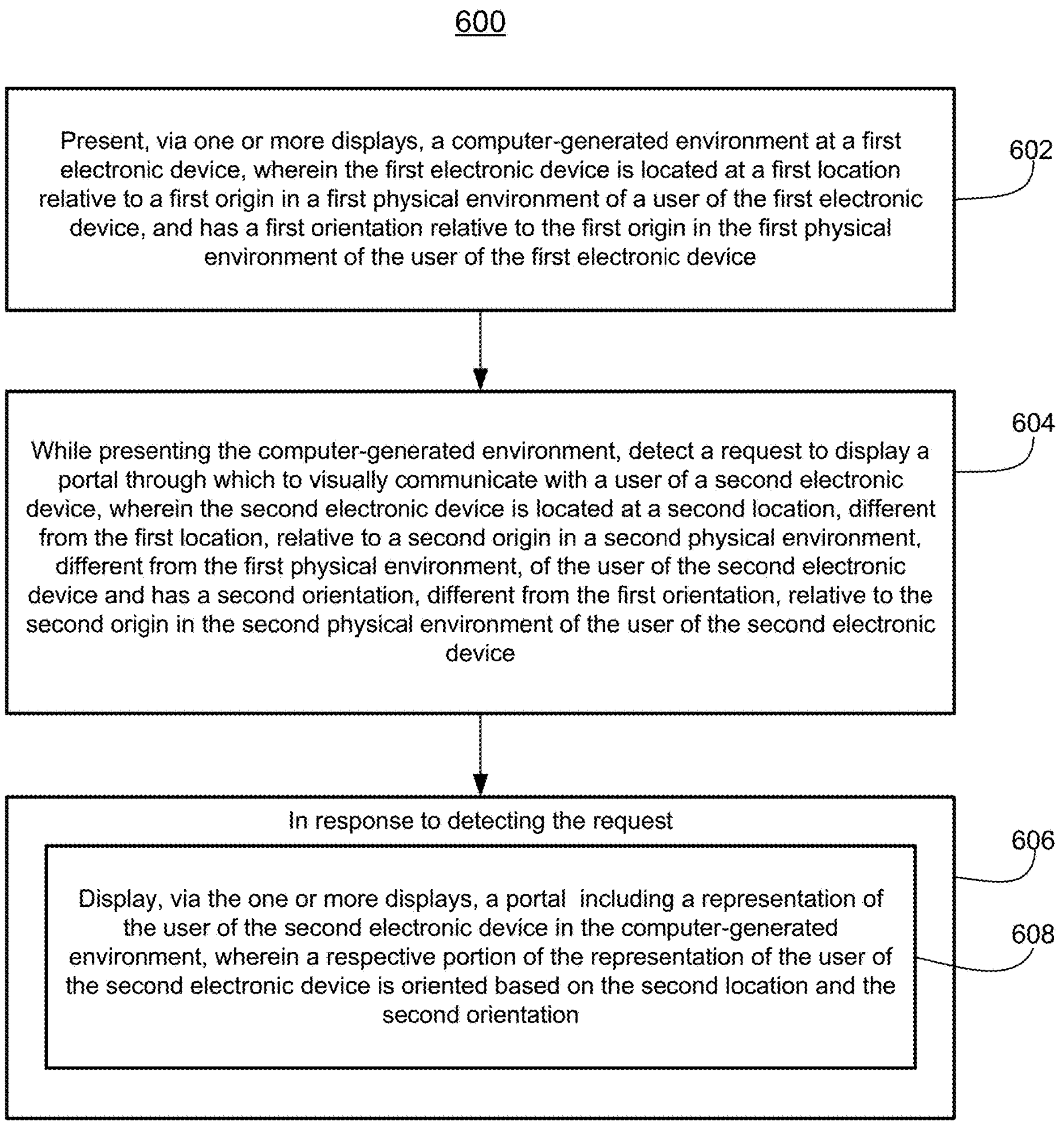
FIG. 6 illustrates a flow diagram illustrating an example process for maintaining eye contact between users who are communicating using portals in a computer-generated environment according to some examples of the disclosure.

FIG. 6 illustrates a flow diagram illustrating an example process for maintaining eye contact between users who are communicating using portals in a computer-generated environment according to some examples of the disclosure. In some examples, process 600 begins at a first electronic device in communication with one or more displays, one or more input devices, and a second electronic device. In some examples, the first electronic device and the second electronic device are optionally a head-mounted display similar or corresponding to electronic devices 260 and 270 of FIG. 2 and/or electronic device 101 of FIG. 1. As shown in FIG. 6, in some examples, at 602, the first electronic device presents, via the one or more displays, a computer-generated environment, wherein the first electronic device is located at a first location relative to a first origin in a first physical environment of a user of the first electronic device, and has a first orientation relative to the first origin in the first physical environment of the user of the first electronic device. For example, as shown in FIG. 4A, first electronic device 460 presents three-dimensional environment 450A, wherein the first electronic device 460 is located at a first location and has a first orientation relative to first origin 440*a* as shown in top-down view 455A.

In some examples, at 604, while presenting the computer-generated environment, the first electronic device detects a request to display a portal through which to visually communicate with a user of the second electronic device, wherein the second electronic device is located at a second location, different from the first location, relative to a second origin in a second physical environment, different from the first physical environment, of the user of the second electronic device and has a second orientation, different from the first orientation, relative to the second origin in the second physical environment of the user of the second electronic device. For example, as described above with reference to FIG. 4B, the first electronic device 460 detects input provided by the user 404*a* for initiating a video call with the user 404*b* of the second electronic device 470. In some examples, as shown in FIG. 4A, the second electronic device 470 is located at a second location and has a second orientation relative to second origin 440*b* as shown in top-down view 455B.

In some examples, at 606, in response to detecting the request, at 608, the first electronic device displays, via the one or more displays, a portal including a representation of the user of the second electronic device in the computer-generated environment, wherein a respective portion of the representation of the user of the second electronic device is oriented based on the second location and the second orientation. In some examples, the respective portion of the representation of the user of the second electronic device is oriented to face toward a viewpoint of the user of the first electronic device. For example, as shown in FIG. 4H, the first electronic device 460 displays video user interface 442 in the three-dimensional environment 450A, wherein the video user interface 442 includes representation 402*b* of the user 404*b* of the second electronic device 470 that is maintaining eye contact with the user 404*a* of the first electronic device 460.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising at a first electronic device in communication with one or more displays, one or more input devices, and a second electronic device: presenting, via the one or more displays, a computer-generated environment, wherein the first electronic device is located at a first location relative to a first origin in a first physical environment of a user of the first electronic device, and has a first orientation relative to the first origin in the first physical environment of the user of the first electronic device; while presenting the computer-generated environment, detecting a request to display a portal through which to visually communicate with a user of the second electronic device, wherein the second electronic device is located at a second location, different from the first location, relative to a second origin in a second physical environment, different from the first physical environment, of the user of the second electronic device and has a second orientation, different from the first orientation, relative to the second origin in the second physical environment of the user of the second electronic device; and in response to detecting the request, displaying, via the one or more displays, a portal including a representation of the user of the second electronic device in the computer-generated environment, wherein a respective portion of the representation of the user of the second electronic device is oriented based on the second location and the second orientation.

Additionally or alternatively, in some examples, the respective portion of the representation of the user of the second electronic device is oriented to face toward a viewpoint of the user of the first electronic device. Additionally or alternatively, in some examples, the representation of the user of the second electronic device corresponds to a two-dimensional representation of the user of the second electronic device. Additionally or alternatively, in some examples, the representation of the user of the second electronic device corresponds to a three-dimensional representation of the user of the second electronic device. Additionally or alternatively, in some examples, the representation of the user of the second electronic device corresponds to one or more three-dimensional images of the user in a camera feed captured via one or more cameras of the second electronic device. Additionally or alternatively, in some examples, the respective portion of the representation of the user of the second electronic device corresponds to one or more eyes of the user of the second electronic device. Additionally or alternatively, in some examples, orienting the respective portion of the representation of the user of the second electronic device to face toward the viewpoint of the user of the first electronic device includes aligning the respective portion of the representation of the user of the second electronic device to face toward one or more eyes of the user of the first electronic device. Additionally or alternatively, in some examples, orienting the respective portion of the representation of the user of the second electronic device to face toward the viewpoint of the user of the first electronic device includes positioning the respective portion of the representation of the user of the second electronic device at a respective height relative to gravity that aligns with a height of one or more eyes of the user of the first electronic device in the computer-generated environment. Additionally or alternatively, in some examples, the one or more eyes of the user of the first electronic device are associated with a first reference point, the one or more eyes of the user of the second electronic device are associated with a second reference point, and positioning the respective portion of the representation of the user of the second electronic device at the respective height relative to gravity that aligns with the height of the one or more eyes of the user of the first electronic device includes aligning, along a vertical axis, the first reference point with the second reference point.

Additionally or alternatively, in some examples, the first reference point is determined based on first skeletal data corresponding to the user of the first electronic device, and the second reference point is determined based on second skeletal data corresponding to the user of the second electronic device. Additionally or alternatively, in some examples, displaying the portal including the representation of the user of the second electronic device in the computer-generated environment includes: determining a first reference point associated with the user of the second electronic device; determining a spatial relationship between the respective location in the computer-generated environment and the first reference point; and positioning the representation of the user of the second electronic device within the portal based on the spatial relationship. Additionally or alternatively, in some examples, orienting the respective portion of the representation of the user of the second electronic device to face toward the viewpoint of the user of the first electronic device includes: receiving at least one of first data and second data provided by the second electronic device; determining, based on the at least one of the first data and the second data, a second reference point associated with the user of the first electronic device relative to a second computer-generated environment presented at the second electronic device; determining a third reference point associated with the user of the first electronic device relative to the computer-generated environment; determining a rotation parameter based on a difference between the second reference point and the third reference point; and orienting the representation of the user of the second electronic device within the portal according to the rotation parameter. Additionally or alternatively, in some examples, the first data indicates a placement location of a second portal through which to visually communicate with the user of the first electronic device in the second computer-generated environment presented at the second electronic device, and the second data indicates a placement location of a representation of the user of the first electronic device within the second portal in the second computer-generated environment.

Additionally or alternatively, in some examples, detecting the request to display the portal through which to visually communicate with the user of the second electronic device includes detecting, via the one or more input devices, user input for displaying the portal in the computer-generated environment. Additionally or alternatively, in some examples, detecting the request to display the portal through which to visually communicate with the user of the second electronic device includes detecting an indication from the second electronic device of the request to display the portal in the computer-generated environment. Additionally or alternatively, in some examples, the method further comprises, in response to detecting the request, performing at least one of: transmitting first data to the second electronic device indicating a placement location of the portal through which to visually communicate with the user of the second electronic device in the computer-generated environment; and transmitting second data to the second electronic device indicating a placement location of the representation of the user of the second electronic device within the portal in the computer-generated environment. Additionally or alternatively, in some examples, the portal corresponds to a two-dimensional virtual object through which to view a portion of the second physical environment of the user of the second electronic device, including the respective portion of the user of the second electronic device. Additionally or alternatively, in some examples, the first electronic device is in a communication session with a third electronic device, different from the first electronic device and the second electronic device, and the computer-generated environment includes an avatar corresponding to the user of the third electronic device. In some examples, the method further comprises, in response to detecting the request, displaying the portal including the representation of the user of the second electronic device in the computer-generated environment, wherein the respective portion of the representation of the user of the second electronic device is oriented to face toward the viewpoint of the user of the first electronic device irrespective of the avatar corresponding to the user of the third electronic device.

Additionally or alternatively, in some examples, the method further comprises: while displaying the portal including the representation of the user of the second electronic device in the computer-generated environment, detecting a request to display a portal through which to visually communicate with a user of a third electronic device, wherein the user of the third electronic device is located at a third location, different from the first location and the second location, and has a third orientation, different from the first orientation and the second orientation, relative to a third origin in a third physical environment, different from the first physical environment and the second physical environment, of the user of the third electronic device; and in response to detecting the request, displaying, via the one or more displays, a second portal including a representation of the user of the third electronic device in the computer-generated environment, wherein a respective portion of the representation of the user of the third electronic device is oriented based on the third location and the third orientation, while maintaining display of the portal including the representation of the user of the second electronic device. Additionally or alternatively, in some examples, the respective portion of the representation of the user of the second electronic device is oriented to face toward a viewpoint of the user of the first electronic device. In some examples, the method further comprises: while displaying the portal including the representation of the user of the second electronic device and the second portal including the representation of the user of the third electronic device in the computer-generated environment, detecting an indication from the second electronic device of movement of the user of the second electronic device that causes the user of the second electronic device to have a fourth orientation, different from the second orientation, relative to the second origin in the second physical environment; and in response to detecting the indication, updating display of the representation of the second user in the portal in the computer-generated environment to be oriented based on the fourth orientation, wherein the respective portion of the representation of the second user is no longer oriented to face toward the viewpoint of the user of the first electronic device and is oriented to face toward the representation of the third user within the second portal. Additionally or alternatively, in some examples, the first electronic device and the second electronic device include a head-mounted display, respectively.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method comprising:

at a first electronic device in communication with one or more displays, one or more input devices, and a second electronic device:

presenting, via the one or more displays, a computer-generated environment, wherein the first electronic device is located at a first location relative to a first origin in a first physical environment of a user of the first electronic device, and has a first orientation relative to the first origin in the first physical environment of the user of the first electronic device;

while presenting the computer-generated environment, detecting a request to display a portal through which to visually communicate with a user of the second electronic device, wherein the second electronic device is located at a second location, different from the first location, relative to a second origin in a second physical environment, different from the first physical environment, of the user of the second electronic device and has a second orientation, different from the first orientation, relative to the second origin in the second physical environment of the user of the second electronic device; and in response to detecting the request:

displaying, via the one or more displays, the portal including a representation of the user of the second electronic device in the computer-generated environment, wherein a respective portion of the representation of the user of the second electronic device is oriented based on the second location and the second orientation.

2. The method of claim 1, wherein the respective portion of the representation of the user of the second electronic device is oriented to face toward a viewpoint of the user of the first electronic device.

3. The method of claim 1, wherein:

the respective portion of the representation of the user of the second electronic device corresponds to one or more eyes of the user of the second electronic device; and orienting the respective portion of the representation of the user of the second electronic device to face toward a viewpoint of the user of the first electronic device includes aligning the respective portion of the representation of the user of the second electronic device to face toward one or more eyes of the user of the first electronic device.

4. The method of claim 3, wherein orienting the respective portion of the representation of the user of the second electronic device to face toward the viewpoint of the user of the first electronic device includes positioning the respective portion of the representation of the user of the second electronic device at a respective height relative to gravity that aligns with a height of one or more eyes of the user of the first electronic device in the computer-generated environment.

5. The method of claim 4, wherein:

the one or more eyes of the user of the first electronic device are associated with a first reference point;

the one or more eyes of the user of the second electronic device are associated with a second reference point; and positioning the respective portion of the representation of the user of the second electronic device at the respective height relative to gravity that aligns with the height of the one or more eyes of the user of the first electronic device includes:

aligning, along a vertical axis, the first reference point with the second reference point.

6. The method of claim 1, wherein displaying the portal including the representation of the user of the second electronic device in the computer-generated environment includes:

determining a first reference point associated with the user of the second electronic device;

determining a spatial relationship between a respective location in the computer-generated environment and the first reference point; and positioning the representation of the user of the second electronic device within the portal based on the spatial relationship.

7. The method of claim 6, wherein orienting the respective portion of the representation of the user of the second electronic device to face toward a viewpoint of the user of the first electronic device includes:

receiving at least one of first data and second data provided by the second electronic device;

determining, based on the at least one of the first data and the second data, a second reference point associated with the user of the first electronic device relative to a second computer-generated environment presented at the second electronic device;

determining a third reference point associated with the user of the first electronic device relative to the computer-generated environment;

determining a rotation parameter based on a difference between the second reference point and the third reference point; and orienting the representation of the user of the second electronic device within the portal according to the rotation parameter.

8. The method of claim 7, wherein:

the first data indicates a placement location of a second portal through which to visually communicate with the user of the first electronic device in the second computer-generated environment presented at the second electronic device; and the second data indicates a placement location of a representation of the user of the first electronic device within the second portal in the second computer-generated environment.

9. A first electronic device comprising:

one or more processors;

memory; and one or more programs stored in the memory and configured to be executed by the one or more processors, the one or more programs including instructions for performing a method comprising:

presenting, via one or more displays, a computer-generated environment, wherein the first electronic device is located at a first location relative to a first origin in a first physical environment of a user of the first electronic device, and has a first orientation relative to the first origin in the first physical environment of the user of the first electronic device;

while presenting the computer-generated environment, detecting a request to display a portal through which to visually communicate with a user of a second electronic device, wherein the second electronic device is located at a second location, different from the first location, relative to a second origin in a second physical environment, different from the first physical environment, of the user of the second electronic device and has a second orientation, different from the first orientation, relative to the second origin in the second physical environment of the user of the second electronic device; and in response to detecting the request:

displaying, via the one or more displays, the portal including a representation of the user of the second electronic device in the computer-generated environment, wherein a respective portion of the representation of the user of the second electronic device is oriented based on the second location and the second orientation.

10. The first electronic device of claim 9, wherein the respective portion of the representation of the user of the second electronic device is oriented to face toward a viewpoint of the user of the first electronic device.

11. The first electronic device of claim 9, wherein:

the respective portion of the representation of the user of the second electronic device corresponds to one or more eyes of the user of the second electronic device; and orienting the respective portion of the representation of the user of the second electronic device to face toward a viewpoint of the user of the first electronic device includes aligning the respective portion of the representation of the user of the second electronic device to face toward one or more eyes of the user of the first electronic device.

12. The first electronic device of claim 11, wherein orienting the respective portion of the representation of the user of the second electronic device to face toward the viewpoint of the user of the first electronic device includes positioning the respective portion of the representation of the user of the second electronic device at a respective height relative to gravity that aligns with a height of one or more eyes of the user of the first electronic device in the computer-generated environment.

13. The first electronic device of claim 12, wherein:

the one or more eyes of the user of the first electronic device are associated with a first reference point;

the one or more eyes of the user of the second electronic device are associated with a second reference point; and positioning the respective portion of the representation of the user of the second electronic device at the respective height relative to gravity that aligns with the height of the one or more eyes of the user of the first electronic device includes:

aligning, along a vertical axis, the first reference point with the second reference point.

14. The first electronic device of claim 9, wherein displaying the portal including the representation of the user of the second electronic device in the computer-generated environment includes:

determining a first reference point associated with the user of the second electronic device;

determining a spatial relationship between a respective location in the computer-generated environment and the first reference point; and positioning the representation of the user of the second electronic device within the portal based on the spatial relationship.

15. The first electronic device of claim 14, wherein orienting the respective portion of the representation of the user of the second electronic device to face toward a viewpoint of the user of the first electronic device includes:

receiving at least one of first data and second data provided by the second electronic device;

determining, based on the at least one of the first data and the second data, a second reference point associated with the user of the first electronic device relative to a second computer-generated environment presented at the second electronic device;

determining a third reference point associated with the user of the first electronic device relative to the computer-generated environment;

determining a rotation parameter based on a difference between the second reference point and the third reference point; and orienting the representation of the user of the second electronic device within the portal according to the rotation parameter.

16. The first electronic device of claim 15, wherein:

the first data indicates a placement location of a second portal through which to visually communicate with the user of the first electronic device in the second computer-generated environment presented at the second electronic device; and the second data indicates a placement location of a representation of the user of the first electronic device within the second portal in the second computer-generated environment.

17. A non-transitory computer readable storage medium storing one or more programs, the one or more programs comprising instructions, which when executed by one or more processors of a first electronic device, cause the first electronic device to perform a method comprising:

presenting, via one or more displays, a computer-generated environment, wherein the first electronic device is located at a first location relative to a first origin in a first physical environment of a user of the first electronic device, and has a first orientation relative to the first origin in the first physical environment of the user of the first electronic device;

while presenting the computer-generated environment, detecting a request to display a portal through which to visually communicate with a user of a second electronic device, wherein the second electronic device is located at a second location, different from the first location, relative to a second origin in a second physical environment, different from the first physical environment, of the user of the second electronic device and has a second orientation, different from the first orientation, relative to the second origin in the second physical environment of the user of the second electronic device; and in response to detecting the request:

displaying, via the one or more displays, the portal including a representation of the user of the second electronic device in the computer-generated environment, wherein a respective portion of the representation of the user of the second electronic device is oriented based on the second location and the second orientation.

18. The non-transitory computer readable storage medium of claim 17, wherein the respective portion of the representation of the user of the second electronic device is oriented to face toward a viewpoint of the user of the first electronic device.

19. The non-transitory computer readable storage medium of claim 17, wherein:

the respective portion of the representation of the user of the second electronic device corresponds to one or more eyes of the user of the second electronic device; and orienting the respective portion of the representation of the user of the second electronic device to face toward a viewpoint of the user of the first electronic device includes aligning the respective portion of the representation of the user of the second electronic device to face toward one or more eyes of the user of the first electronic device.

20. The non-transitory computer readable storage medium of claim 19, wherein orienting the respective portion of the representation of the user of the second electronic device to face toward the viewpoint of the user of the first electronic device includes positioning the respective portion of the representation of the user of the second electronic device at a respective height relative to gravity that aligns with a height of one or more eyes of the user of the first electronic device in the computer-generated environment.

21. The non-transitory computer readable storage medium of claim 20, wherein:

the one or more eyes of the user of the first electronic device are associated with a first reference point;

the one or more eyes of the user of the second electronic device are associated with a second reference point; and positioning the respective portion of the representation of the user of the second electronic device at the respective height relative to gravity that aligns with the height of the one or more eyes of the user of the first electronic device includes:

aligning, along a vertical axis, the first reference point with the second reference point.

22. The non-transitory computer readable storage medium of claim 17, wherein displaying the portal including the representation of the user of the second electronic device in the computer-generated environment includes:

determining a first reference point associated with the user of the second electronic device;

determining a spatial relationship between a respective location in the computer-generated environment and the first reference point; and positioning the representation of the user of the second electronic device within the portal based on the spatial relationship.

23. The non-transitory computer readable storage medium of claim 22, wherein orienting the respective portion of the representation of the user of the second electronic device to face toward a viewpoint of the user of the first electronic device includes:

receiving at least one of first data and second data provided by the second electronic device;

determining, based on the at least one of the first data and the second data, a second reference point associated with the user of the first electronic device relative to a second computer-generated environment presented at the second electronic device;

determining a third reference point associated with the user of the first electronic device relative to the computer-generated environment;

determining a rotation parameter based on a difference between the second reference point and the third reference point; and orienting the representation of the user of the second electronic device within the portal according to the rotation parameter.

24. The non-transitory computer readable storage medium of claim 23, wherein:

the first data indicates a placement location of a second portal through which to visually communicate with the user of the first electronic device in the second computer-generated environment presented at the second electronic device; and the second data indicates a placement location of a representation of the user of the first electronic device within the second portal in the second computer-generated environment.

* * * * *